United States Patent
Zhang et al.

(10) Patent No.: US 12,325,641 B2
(45) Date of Patent: Jun. 10, 2025

(54) SYSTEMS AND METHODS FOR PRODUCING LITHIUM CARBONATE AND USES THEREOF

(71) Applicant: Albemarle Corporation, Charlotte, NC (US)

(72) Inventors: Yinzhi Zhang, Charlotte, NC (US); Jeffrey McCall, Kings Mountain, NC (US); Peiyu Cai, Cramerton, NC (US); Richard A Holub, Huntersville, NC (US)

(73) Assignee: ALBEMARLE CORPORATION, Charlotte, NC (US)

( * ) Notice: Subject to any disclaimer, the term of this patent is extended or adjusted under 35 U.S.C. 154(b) by 0 days.

(21) Appl. No.: 18/816,364

(22) Filed: Aug. 27, 2024

(65) Prior Publication Data
US 2024/0417270 A1    Dec. 19, 2024

Related U.S. Application Data

(63) Continuation of application No. PCT/US2024/040730, filed on Aug. 2, 2024.

(60) Provisional application No. 63/637,933, filed on Apr. 24, 2024.

(51) Int. Cl.
*C01D 15/08*     (2006.01)
*C01B 25/45*     (2006.01)
*C01D 7/07*      (2006.01)

(52) U.S. Cl.
CPC .............. *C01D 15/08* (2013.01); *C01B 25/45* (2013.01); *C01D 7/07* (2013.01); *C01P 2004/03* (2013.01); *C01P 2004/34* (2013.01); *C01P 2004/61* (2013.01); *C01P 2004/84* (2013.01); *C01P 2006/12* (2013.01); *C01P 2006/20* (2013.01)

(58) Field of Classification Search
CPC ..................................................... C01D 15/08
See application file for complete search history.

(56) References Cited

U.S. PATENT DOCUMENTS

2021/0344058 A1*  11/2021  Liu ................... C22B 15/0052

* cited by examiner

*Primary Examiner* — Stuart L Hendrickson
(74) *Attorney, Agent, or Firm* — KDW Firm PLLC

(57) ABSTRACT

The present disclosure is directed to systems and methods of producing lithium carbonate. The lithium carbonate can be produced by contacting a lithium precursor with a carbon dioxide gas. The lithium carbonate produced from this method can include micron-sized lithium carbonate particles with nano-sized lithium carbonate particles coated on a surface of the micron-sized lithium carbonate particles.

16 Claims, 12 Drawing Sheets

SYSTEMS AND METHODS FOR PRODUCING LITHIUM CARBONATE AND USES THEREOF

CROSS-REFERENCE TO RELATED APPLICATIONS

This application is a continuation of PCT/US2024/040730, filed Aug. 2, 2024, entitled "SYSTEMS AND METHODS FOR PRODUCING LITHIUM CARBONATE AND USES THEREOF" which claims the benefit of U.S. Provisional Application No. 63/637,933 filed Apr. 24, 2024, entitled "SYSTEMS AND METHODS FOR PRODUCING LITHIUM CARBONATE FROM LITHIUM HYDROXIDE", the entire contents of which are incorporated herein by reference.

FIELD

This disclosure relates to systems and methods for producing lithium carbonate from lithium hydroxide. More specifically, this disclosure relates to systems and methods for producing lithium carbonate by contacting lithium hydroxide with gaseous carbon dioxide.

BACKGROUND

Lithium hydroxide is typically converted to lithium carbonate through a precipitation reaction. Such a precipitation process 100 is shown in FIG. 1. In a first step 101, lithium hydroxide can be dissolved in a solvent such as water. In a second step 102, carbon dioxide can be added to the lithium hydroxide solution (e.g., via bubbling) to precipitate lithium carbonate. In this reaction, lithium hydroxide reacts with carbon dioxide to form lithium carbonate and water. The lithium carbonate can precipitate out of the solution as a solid, while the water can remain in solution. Once the reaction is complete, the solid lithium carbonate can be separated (step 103) from the solution by filtration or other separation methods and then washed to remove any impurities. At step 104, the separated lithium carbonate can be dried and then the dried lithium carbonate can be milled 105 to a desired particle size distribution.

SUMMARY

Described herein are systems and methods of producing lithium carbonate. Specifically, the lithium carbonate can be created in a single step conversion process without dissolving a lithium precursor in a solvent. For example, lithium hydroxide can be directly converted to lithium carbonate by contacting the lithium hydroxide with carbon dioxide gas. In some embodiments, carbon dioxide can be injected into the jet mill such that lithium hydroxide can be converted to lithium carbonate while simultaneously reducing the particle size. Applicant unexpectedly discovered that such a process can result in a high purity lithium carbonate powder that includes nano-sized lithium carbonate particles coated on the surface of micron-sized lithium carbonate particles. Such a lithium carbonate production process can reduce the amount of steps required to form lithium carbonate, thereby reducing overall lithium carbonate production costs.

In some embodiments, a method of producing lithium carbonate includes contacting a solid lithium precursor with a gas comprising at least 5 wt. % carbon dioxide, thereby converting at least a portion of the solid lithium precursor to lithium carbonate. In some embodiments, the solid lithium precursor is milled in a jet mill with an atmosphere comprising the gas. In some embodiments, the lithium precursor comprises inorganic lithium salts, organic lithium salts, lithium metals, lithium alloys, lithium oxides, lithium hydroxides, or combinations thereof. In some embodiments, the lithium precursor comprises lithium hydroxide. In some embodiments, the lithium hydroxide is lithium hydroxide monohydrate. In some embodiments, the gas comprises at least 25 wt. % carbon dioxide. In some embodiments, the gas comprises at least 50 wt. % carbon dioxide. In some embodiments, at least 75% of the solid lithium precursor is converted into lithium carbonate. In some embodiments, the lithium carbonate comprises micron-sized lithium carbonate particles and nano-sized lithium carbonate particles coated on the micron-sized lithium carbonate particles. In some embodiments, the micron-sized lithium carbonate particles have a particle size distribution with a D50 of 1-10 microns. In some embodiments, at least a portion of the micron-sized lithium carbonate particles are hollow. In some embodiments, the lithium carbonate has a Brunauer-Emmett-Teller (BET) specific surface area of about 2-12 $m^2/g$. In some embodiments, the method includes drying the lithium carbonate with or without presence of carbon dioxide gas in a fluidized bed.

In some embodiments, a powder includes micron-sized lithium carbonate particles; and nano-sized lithium carbonate particles coated on a surface of the micron-sized lithium carbonate particles. In some embodiments, at least a portion of the micron-sized lithium carbonate particles are hollow. In some embodiments, the micron-sized lithium carbonate particles have a particle size distribution with a D50 of 1-10 microns. In some embodiments, the lithium carbonate has a Brunauer-Emmett-Teller (BET) specific surface area of about 2-12 $m^2/g$.

In some embodiments, a method of making a cathode active material includes mixing a metal precursor and a lithium carbonate powder, wherein the lithium carbonate powder comprises: micron-sized lithium carbonate particles; and nano-sized lithium carbonate particles coated on a surface of the micron-sized lithium carbonate particles; and heating the mixture to a peak temperature between 600-800° C. for at least 5 hours to form the cathode active material. In some embodiments, the metal precursor comprises a compound or a mixture of compounds each having the formula (4):

$$qFePO_4 \cdot (1-q)A_xB_y(PO_4)_{1-k} \qquad (4)$$

in which A=Fe, Mn, Co, and/or Ni; B=Mg, Al, Ti, Zr, Nb, and/or W; x+y=1; 0≤y≤0.1; 0≤q≤1; and 0≤k≤0.2. In some embodiments, the method includes mixing a carbon source with the metal precursor and the lithium carbonate powder. In some embodiments, the carbon source comprises glucose, dextran, sucrose, or combinations thereof. In some embodiments, the cathode active material comprises a compound having the formula (5):

$$qLiFePO_4 \cdot (1-q)LiA_xB_y(PO_4) \qquad (5)$$

wherein A=Fe, Mn, Co, and/or Ni; B=Mg, Al, Ti, Zr, Nb, and/or W; x+y=1; 0≤y≤0.1; 0≤q≤1. In some embodiments, mixing comprises milling the mixture. In some embodiments, at least a portion of the micron-sized lithium carbonate particles are hollow. In some embodiments, the micron-sized lithium carbonate particles have a particle size distribution with a D50 of 1-10 microns. In some embodiments, the lithium carbonate has a Brunauer-Emmett-Teller (BET) specific surface area of about 2-12 m²/g.

In some embodiments, a method of making a cathode active material includes mixing a metal source, a phosphate source, and a lithium carbonate powder, wherein the lithium carbonate powder comprises: micron-sized lithium carbonate particles; and nano-sized lithium carbonate particles coated on a surface of the micron-sized lithium carbonate particles. In some embodiments, the metal source comprises an iron source, a cobalt source, a manganese source, a nickel source, or combinations thereof. In some embodiments, the iron source comprises $Fe_2O_3$, Fe, $Fe_3O_4$, Fe $(CH_3COO)_2$, $FeC_2O_4$, $FeSO_4$, $Fe(NO_3)_3$, or combinations thereof, the cobalt source comprises $Co_3O_4$, CoO, or combinations thereof, the manganese source comprises $MnCO_3$, $MnO_2$, $Mn_3O_4$, or combinations thereof, and the nickel source comprises $Ni(OH)_2$, NiO, $NiCO_3$, or combinations thereof. In some embodiments, the phosphate source comprises $H_3PO_4$, $NH_4H_2PO_4$, $(NH_4)_2HPO_4$, $(NH_4)PO_4$, or combinations thereof. In some embodiments, the method includes mixing a carbon source with the metal precursor and the lithium carbonate powder. In some embodiments, the carbon source comprises glucose, dextran, sucrose, or combinations thereof. In some embodiments, mixing comprises milling the mixture. In some embodiments, the method includes heating the mixture to a peak temperature between 600-800° C. for at least 5 hours to form the cathode active material. In some embodiments, the method includes drying the mixture to form a cathode active material precursor. In some embodiments, the drying comprises spray drying the mixture to form the cathode active material precursor. In some embodiments, the method includes heating the cathode active material precursor to a peak temperature between 600-800° C. for at least 5 hours to form the cathode active material. In some embodiments, the cathode active material comprises a compound having the formula (5):

$$q\text{LiFePO}_4 \cdot (1-q)\text{LiA}_x\text{B}_y(\text{PO}_4) \quad (5)$$

wherein A=Fe, Mn, Co, and/or Ni; B=Mg, Al, Ti, Zr, Nb, and/or W; $x+y=1$; $0 \leq y \leq 0.1$; $0 \leq q \leq 1$. In some embodiments, at least a portion of the micron-sized lithium carbonate particles are hollow. In some embodiments, the micron-sized lithium carbonate particles have a particle size distribution with a D50 of 1-10 microns. In some embodiments, the lithium carbonate has a Brunauer-Emmett-Teller (BET) specific surface area of about 2-12 m²/g.

In some embodiments, a method of making a cathode active material includes mixing a metal precursor and a lithium carbonate powder, wherein the lithium carbonate powder comprises: micron-sized lithium carbonate particles; and nano-sized lithium carbonate particles coated on a surface of the micron-sized lithium carbonate particles; and heating the mixture to a peak temperature between 500-1200° C. for at least 30 minutes to form the cathode active material. In some embodiments, the metal precursor comprises a compound or a mixture of compounds each having the formula 1 or an oxide counterpart thereof:

$$q\text{Mn(OH)}_2 \cdot (1-q)\text{Ni}_a\text{Mn}_b\text{Co}_c\text{M}_y\text{X}_{1+k} \quad (1)$$

wherein $0 \leq q \leq 0.8$, $c=1-a-b$, $0 \leq a \leq 1$, $0 < b \leq 1$, $0 \leq y \leq 0.05$ and M includes one or more selected from the group consisting of Al, Mg, Ti, Mo, Nb, Zr, Hf, Ta, W, B, P and F; wherein X is selected from the group consisting of $OH^-$, $CO_3^{2-}$, $NO_3^-$, $SO_4^{2-}$, $C_2O_4^{2-}$, $C_2H_3O_2^-$, $CHO_2^-$, stearate, oleate, tartrate and lactate, and $-0.025 \leq k \leq 1.25$. In some embodiments, the cathode active material comprises a compound having the formula (3):

$$q\text{Li}_2\text{MnO}_3 \cdot (1-q)\text{LiNi}_a\text{Mn}_b\text{Co}_c\text{MyO}_{2+z} \quad (3)$$

wherein $0 \leq q \leq 0.8$, $c=1-a-b$, $0 \leq a \leq 1$, $0 < b \leq 1$, $0 \leq y \leq 0.05$, $-0.025 \leq z \leq 0.125$, and M is selected from the group consisting of Al, Mg, Ti, Mo, Nb, Zr, Hf, Ta, W, B, P, F and a combination of any two or more of the foregoing. In some embodiments, at least a portion of the micron-sized lithium carbonate particles are hollow. In some embodiments, the micron-sized lithium carbonate particles have a particle size distribution with a D50 of 1-10 microns. In some embodiments, the lithium carbonate has a Brunauer-Emmett-Teller (BET) specific surface area of about 2-12 m²/g.

In some embodiments, a method of making a cathode include mixing the cathode active material made by any of the above methods with a conductive additive, a binder, and a solvent to form a slurry; coating the slurry on a current collector; and calendaring the coated current collector to form the cathode. In some embodiments, the conductive additive comprises carbon black, vapor grown carbon fiber (VGCF), graphite, graphene, carbon nanotubes, or combinations thereof. In some embodiments, the binder comprises polyvinylidene fluoride (PVDF), carboxymethoxy cellulose (CMC), lithium substituted polyacrylic acid (LiPAA), or combinations thereof. In some embodiments, the solvent comprises N-Methyl-2-pyrrolidone, water, or combinations thereof.

In some embodiments, a battery includes the cathode made by any of the methods above. In some embodiments, the battery is a lithium-ion battery.

It will be appreciated that any of the variations, aspects, features and options described in view of the systems, methods, and/or powders apply equally to the systems, methods, powders, other devices/configurations, and vice versa. It will also be clear that any one or more of the above variations, aspects, features and options can be combined.

Additional advantages will be readily apparent to those skilled in the art from the following detailed description. The aspects and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE FIGURES

The disclosure will now be described, by way of example only, with reference to the accompanying drawings, in which.

DETAILED DESCRIPTION

Reference will now be made in detail to implementations and embodiments of various aspects and variations of devices, powders, systems, and methods described herein. Although several exemplary variations of the devices, powders, systems, and methods are described herein, other variations of the devices, powders, systems, and methods may include aspects of the devices, powders, systems, and methods described herein combined in any suitable manner having combinations of all or some of the aspects described.

Described herein are systems and methods of producing lithium carbonate powder or particles. Specifically, disclosed herein are systems and methods of converting lithium precursors to lithium carbonate in a single step. The lithium carbonate produced herein can be used for producing electrode materials in lithium-ion batteries.

Figure 1:
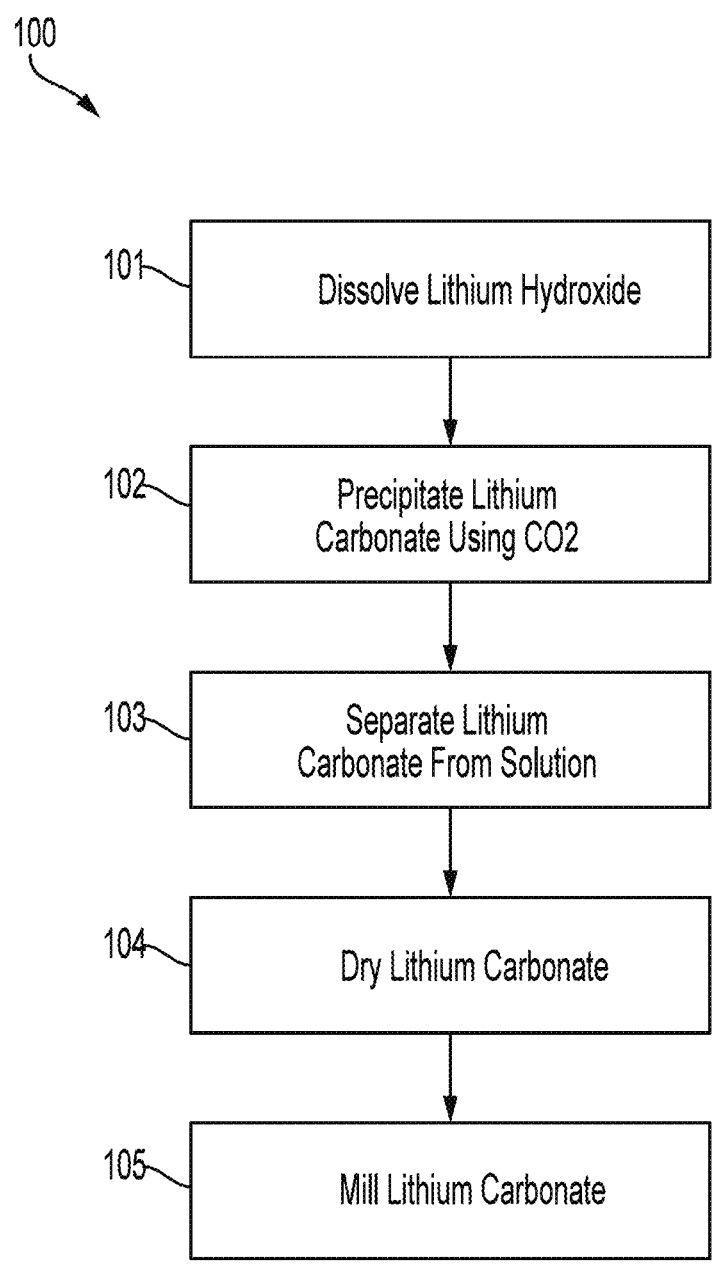
FIG. 1 illustrates an example flowchart of a typical lithium carbonate precipitation production process.
Figure 2:
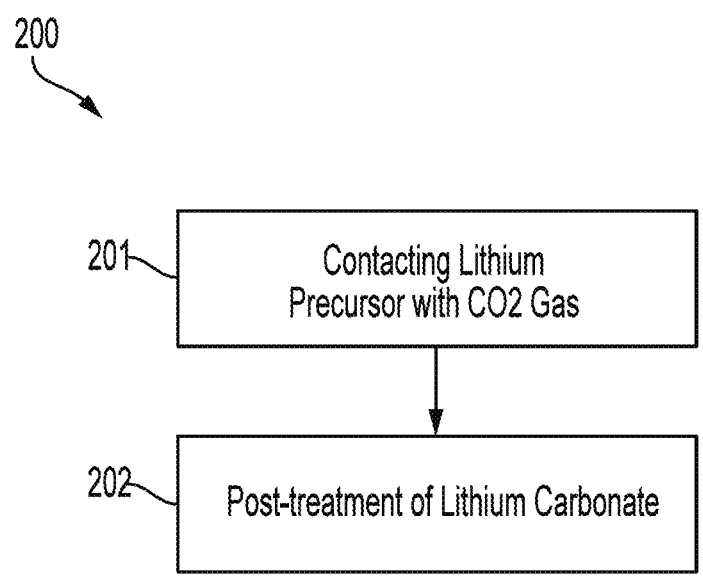
FIG. 2 illustrates an example flowchart for a lithium carbonate production process in accordance with some embodiments disclosed herein.

FIG. 2 illustrates process 200 for producing lithium carbonate as disclosed herein. To form the lithium carbonate disclosed herein, a lithium precursor can be contacted with a carbon dioxide containing gas. In some embodiments, the carbon dioxide containing gas can entrain the lithium precursor. In some embodiments, the lithium precursor can be entrained in a carrier gas that is then contacted by a carbon dioxide containing gas. In some embodiments, the carrier gas and the carbon dioxide containing gas can be the same or different as the carbon dioxide containing gas. In some embodiments, the carrier gas can be air, nitrogen, argon, etc. In some embodiments, the lithium precursor can be milled in an atmosphere that includes carbon dioxide.

In some embodiments, the lithium precursor can be lithium metal-containing compounds such as inorganic lithium salts, organic lithium salts, non-salt lithium compounds that include lithium metals, lithium alloys, lithium oxides, lithium hydroxides, or combinations thereof. Mixtures of any two or more lithium compounds, or mixtures from different types of lithium precursors (e.g., a lithium alloy and an inorganic lithium salt) can be used as the lithium precursor. In some embodiments, the lithium metals and/or lithium alloys (e.g., with silicon, magnesium, and/or aluminum) can be the one or more lithium precursors, alone or in combinations with one or more organic and/or inorganic lithium salts. In some embodiments, the one or more lithium precursors can be in the form of a powder.

In some embodiments, the inorganic lithium salts can include lithium chloride, lithium bromide, lithium iodide, lithium chlorate, lithium carbonate, lithium bicarbonate, lithium nitrite, lithium nitrate, lithium sulfide, lithium sulfite, lithium sulfate, lithium phosphite, lithium phosphate, lithium hydroxide (e.g., anhydrous lithium hydroxide and/or lithium hydroxide monohydrate including blends of anhydrous and monohydrate lithium hydroxide), or combinations thereof. In some embodiments, hydrated forms of these inorganic lithium salts (e.g., lithium hydroxide monohydrate) can also be used. In some embodiments, the organic lithium salts can include lithium acetate, lithium acetylacetate, lithium benzoate, lithium citrate, lithium formate, lithium oxalate, lithium salicylate, lithium tartrate, polymers comprising lithium, or combinations thereof.

In some embodiments, the lithium precursor can be in a solid phase when contacted with a carbon dioxide containing gas. In some embodiments, the lithium precursor particles can have a particle size distribution with a D50 of about 0.1-50,000 microns or about 100-10,000 microns.

In some embodiments, contacting the lithium precursor with a carbon dioxide gas can include milling the lithium precursor. In some embodiments, the lithium precursor can be milled via a ball mill, jet mill, attrition mill, hammer mill, cryogenic mill, colloid mill, fluid energy mill, and/or ultrasonic mill. In some embodiments, the milling can be conducted in an atmosphere comprising carbon dioxide gas. In some embodiments, the gas contacting the lithium precursor or the atmosphere comprises at least about 1 wt. %, at least about 2 wt. %, at least about 5 wt. %, at least about 10 wt. %, at least about 15 wt. %, at least about 25 wt. %, at least about 50 wt. %, at least about 75 wt. %, at least about 90 wt. %, at least about 95 wt. %, at least about 98 wt. %, at least about 99 wt. %, or about 100 wt. % carbon dioxide.

In some embodiments, the lithium precursor can be fed to the milling device at a specific feed rate. Inside the milling device, the lithium precursor fed to the milling device can be milled and/or pulverized to reduce the particle size while simultaneously reacting with the carbon dioxide to form lithium carbonate. In some embodiments, inside the milling device, the lithium precursor can be exposed to an atmosphere containing carbon dioxide or a gas containing carbon dioxide, thereby converting the lithium precursor to lithium carbonate.

In some embodiments, the milling device is a jet mill. In some embodiments, a gas comprising carbon dioxide is injected into the jet mill during the milling process. In some embodiments, the gas comprises at least about 1 wt. %, at least about 2 wt. %, at least about 5 wt. %, at least about 10 wt. %, at least about 15 wt. %, at least about 25 wt. %, at least about 50 wt. %, at least about 75 wt. %, at least about 90 wt. %, at least about 95 wt. %, at least about 98 wt. %, at least about 99 wt. %, or about 100 wt. % carbon dioxide. In some embodiments, the lithium precursor can be contacted with and entrained in the gas containing carbon dioxide in the mill. In some embodiments, the lithium precursor is rolled up with the injected gas and can swirl together with the gas inside the mill. In some embodiments, while swirling, the lithium precursor particles (and/or the formed lithium carbonate particles) can be milled by mutual collision with each other. In some embodiments, the reacted and milled particles can be guided upward with ascending gas flows to a classifier connected to the jet mill, where the particles can be classified and coarse (i.e., larger) particles can be returned (or dropped) back to the mill for further milling. In some embodiments, the classifier can be a centrifugal classifier, a micro-separator, and/or any other type of classifier. In some embodiments, the lithium precursor particles (and/or the formed lithium carbonate particles) can be milled to a predetermined particle size distribution.

In some embodiments, the gas pressure to the mill can be about 1-500 psig, about 10-200 psig, about 50-150 psig, or about 60-120 psig. In some embodiments, the temperature of when the lithium precursor is contacted with the carbon dioxide gas can be at an elevated temperature. In some embodiments, the temperature of the milling step can be conducted at an elevated temperature. In some embodiments, the temperature of the milling step can be conducted at about 15-200° C., about 15-20° C., about 15-30° C., about 20-25° C., about 75-125° C., about 90-110° C., or about 95-105° C. In some embodiments, the temperature of the milling step can be conducted at at least about 15° C., at least about 20° C., at least about 25° C., at least about 50° C., at least about 75° C., at least about 90° C., at least about 95° C., at least about 100° C., at least about 105° C., or at least about 110° C. In some embodiments, the temperature of the milling step can be conducted at at most about 200° C., at most about 150° C., at most about 110° C., at most about 105° C., at most about 100° C., at most about 95° C., at most about 75° C., at most about 50° C., at most about 30° C., at most about 25° C., at most about 23° C., or at most about 20° C.

In some embodiments, the residence time of the particles in the jet mill can be about 0.001 seconds to 5 mins or about 0.01-30 seconds.

In some embodiments, lithium bicarbonate can also be produced during the process. In other words, in some embodiments, at least a portion of the lithium precursor can react with carbon dioxide to form lithium bicarbonate. However, the processes disclosed herein, can result in a high conversion rate of lithium precursor to lithium carbonate. In some embodiments, the conversion from lithium precursor to lithium carbonate can be at least about 50%, at least about 75%, at least about 80%, at least about 85%, at least about 90%, at least about 95%, at least about 96%, at least about 97%, at least about 98%, at least about 99%, or at least about 99.5% conversion. The conversion percentage of lithium precursor to lithium carbonate can be measured by techniques known to those of ordinary skill in the art, including for example, using x-ray diffraction analysis.

In some embodiments, the powder produced by the process disclosed herein can be at least about at least about 50%, at least about 75%, at least about 80%, at least about 85%, at least about 90%, at least about 95%, at least about 96%, at least about 97%, at least about 98%, at least about 99%, at least about 99.5%, or about 100% lithium carbonate. The percentage of lithium carbonate in a powder can be measured by techniques known to those of ordinary skill in the art, including for example, using x-ray diffraction analysis.

In some embodiments, the lithium carbonate produced by the processes disclosed herein can have a particle size distribution with a D50 of about 0.1-50 microns, about 1-25 microns, about 1-15 microns, about 1-10 microns, about 2-8 microns, about 5-15 microns, about 3-8 microns, or about 3-5 microns. In some embodiments, the lithium carbonate produced by the processes disclosed herein can have a particle size distribution with a D50 of at least about 0.1 microns, at least about 1 micron, at least about 2 microns, at least about 3 microns, at least about 4 microns, at least about 5 microns, at least about 6 microns, at least about 7 microns, at least about 8 microns, at least about 9 microns, or at least about 10 microns. In some embodiments, the lithium carbonate produced by the processes disclosed herein can have a particle size distribution with a D50 of at most about 30 microns, at most about 20 microns, at most about 15 microns, at most about 10 microns, at most about 9 microns, at most about 8 microns, at most about 7 microns, at most about 6 microns, or at most about 5 microns. This D50 can be the overall/integral particle (nano-sized lithium carbonate coated on micron-sized lithium carbonate). The particle size and particle size distributions can be measured by techniques known to those of ordinary skill in the art, including for example, a Malvern Mastersizer 300. In some embodiments, the lithium carbonate produced by the processes disclosed herein can have a particle size distribution with a D10 of about 0.1-10 microns, about 0.5-5 microns, or about 1-3 microns. In some embodiments, the lithium carbonate produced by the processes disclosed herein can have a particle size distribution with a D10 of at least about 0.1 microns, at least about 0.5 microns, at least about 1 micron, at least about 2 microns, at least about 3 microns, at least about 4 microns, or at least about 5 microns. In some embodiments, the lithium carbonate produced by the processes disclosed herein can have a particle size distribution with a D10 of at most about 10 microns, at most about 8 microns, at most about 5 microns, at most about 3 microns, at most about 2 microns, or at most about 1 micron. In some embodiments, the lithium carbonate produced by the process disclosed herein can have a particle size distribution with a D90 of about 5-50 microns, about 10-50 microns, or about 15-30 microns. In some embodiments, the lithium carbonate produced by the process disclosed herein can have a particle size distribution with a D90 of at least about 5 microns, at least about 10 microns, at least about 15 microns, at least about 20 microns, at least about 25 microns, or at least about 30 microns. In some embodiments, the lithium carbonate produced by the process disclosed herein can have a particle size distribution with a D90 of at most about 100 microns, at most about 50 microns, at most about 40 microns, at most about 35 microns, or at most about 30 microns.

Applicants unexpectedly discovered that the lithium carbonate produced by the processes disclosed herein has a unique structure. Specifically, the lithium carbonate can include micron-sized lithium carbonate particles, wherein the surface of the micron-sized lithium carbonate particles can be coated with nano-sized lithium carbonate particles. In some embodiments, the micron-sized lithium carbonate particles have a coating layer comprising nano-sized lithium carbonate particles. In some embodiments, a plurality of nano-sized lithium carbonate particles can coat a micron-sized lithium carbonate particle. In some embodiments, at least about 5%, at least about 10%, at least about 15%, at least about 20%, at least about 25%, at least about 30%, at least about 35%, at least about 40%, at least about 50%, at least about 60%, at least about 65%, at least about 70%, at least about 75%, at least about 80%, at least about 85%, at least about 90%, or at least about 95% of the surface of a micron-sized lithium carbonate particle can be coated with nano-sized lithium carbonate particles. In some embodiments, the lithium carbonate powder can have a core-shell structure, wherein micron-sized lithium carbonate particles can form the core and the shell is a layer or coating that includes nano-sized lithium carbonate particles. In some embodiments, the micron-sized lithium carbonate particles can be hollow. In some embodiments, at least some of the micron-sized lithium carbonate particles can be hollow. In some embodiments, the micron-sized lithium carbonate particles may be a lithium carbonate shell. In some embodiments, unreacted lithium hydroxide may be inside the micron-sized particles. In some embodiments, the micron-sized lithium carbonate particles may have a lithium carbonate shell with unreacted lithium hydroxide on the inside or on an interior surface of the lithium carbonate shell. In other words, when solid lithium hydroxide is contacted with gaseous carbon dioxide, the reaction can go from the outside of the lithium hydroxide inward.

In some embodiments, the lithium carbonate produced by the processes disclosed herein can have a tap density of about 0.1-2 g/mL, about 0.25-0.75 g/mL, about 0.4-0.75 g/mL, about 0.45-0.7 g/mL, or about 0.45-0.55 g/mL. In some embodiments, the lithium carbonate produced by the processes disclosed herein can have a tap density of at least about 0.05 g/mL, at least about 0.1 g/mL, at least about 0.25 g/mL, at least about 0.4 g/mL, at least about 0.45 g/mL, or at least about 0.5 g/mL. In some embodiments, the lithium carbonate produced by the processes disclosed herein can have a tap density of at most about 2 g/mL, at most about 1 g/mL, at most about 0.75 g/mL, at most about 0.7 g/mL, at most about 0.65 m/L, at most about 0.6 m/L, or at most about 0.55 g/mL. Tap density can be measured by techniques known to those of ordinary skill in the art. For example, to measure tap density, a known mass of powder was introduced into a graduated cylinder. That cylinder is then tapped for a set amount of taps or time allowing the powder to pack in more densely. The resulting volume is then measured.

In some embodiments, the micron-sized lithium carbonate particles can have a particle size distribution with a D50 of about 1-50 microns, about 1-25 microns, about 1-10 microns, about 2-8 microns, about 3-8 microns, or about 3-5 microns. In some embodiments, the micron-sized lithium carbonate particles can have a particle size distribution with a D50 of at least about 1 micron, at least about 2 microns, at least about 3 microns, at least about 4 microns, at least about 5 microns, at least about 6 microns, at least about 7 microns, at least about 8 microns, at least about 9 microns, or at least about 10 microns. In some embodiments, the micron-sized lithium carbonate particles can have a particle size distribution with a D50 of at most about 30 microns, at most about 20 microns, at most about 15 microns, at most about 10 microns, at most about 9 microns, at most about 8 microns, at most about 7 microns, at most about 6 microns, or at most about 5 microns. In some embodiments, the nano-sized lithium carbonate particles can have a particle size of about 1-1000 nm, about 50-500 nm, about 75-125 nm, or about 100 nm as measured by techniques known to those of ordinary skill in the art, including for example, by SEM imaging.

In some embodiments, the lithium carbonate powder can have a Brunauer-Emmett-Teller (BET) specific surface area of about 1-50 $m^2/g$, about 1-20 $m^2/g$, about 1-15 $m^2/g$, about 1-15 $m^2/g$, or about 2-12 $m^2/g$. In some embodiments, the lithium carbonate powder can have a BET specific surface area of at least about 0.1 $m^2/g$, at least about 0.5 $m^2/g$, at least about 1 $m^2/g$, at least about 2 $m^2/g$, at least about 3 $m^2/g$, at least about 4 $m^2/g$, at least about 5 $m^2/g$, at least about 6 $m^2/g$, at least about 7 $m^2/g$, or at least about 10 $m^2/g$. In some embodiments, the lithium carbonate powder can have a BET specific surface area of at most about 20 $m^2/g$, at most about 15 $m^2/g$, at most about 12 $m^2/g$, at most about 10 $m^2/g$, at most about 8 $m^2/g$, at most about 7 $m^2/g$, at most about 6 $m^2/g$, at most about 5 $m^2/g$, at most about 4 $m^2/g$, or at most about 3 $m^2/g$. In some embodiments, the lithium carbonate powder can have a BET specific surface area of about 2-7 $m^2/g$ if the starting lithium precursor was lithium hydroxide monohydrate. In some embodiments, the lithium carbonate powder can have a BET specific surface area of greater than or equal to about 7 or 10 $m^2/g$ if starting with anhydrous lithium hydroxide. Specific surface area can be measured by techniques known to those of ordinary skill in the art, including for example, a Micromcritics ASAP 2020 Plus.

In some embodiments, milling the particles can include multiple rounds of milling. For example, the particles removed from the mill can be reintroduced into the mill for a second round of milling. The process can be repeated for as many rounds as desired.

In some embodiments, after the contacting step 201, the lithium carbonate can be post-treated in a post-treatment step 202. In some embodiments, the post-treatment step can include drying the lithium carbonate. For example, the lithium carbonate may include some moisture from the conversion reaction. As such, a drying step can remove the moisture from the lithium carbonate. In some embodiments, the drying can occur in a fluidized bed dryer. In some embodiments, the drying can occur in a carbon dioxide environment. In some embodiments, the carbon dioxide environment can be any carbon dioxide concentration gas disclosed herein. In some embodiments, the drying can occur under vacuum. In some embodiments, the lithium carbonate can be dried for about 1 minute to about 50 hours, about 1-50 hours, about 5-30 hours, about 10-25 hours, or about 15-20 hours. In some embodiments, the lithium carbonate can be dried at temperature of about 20-500° C., about 50-250° C., about 75-200° C., about 100-200° C., about 125-175° C., or about 150° C. In some embodiments, the post-treatment step can include aging in a carbon dioxide environment. In some embodiments, the carbon dioxide environment can be any carbon dioxide concentration gas disclosed herein.

Electrode Active Material Synthesis

In some embodiments, the lithium carbonate powder can be used to make an electrode (e.g., cathode) active material. In some embodiments, the lithium carbonate powder can be used to make a lithium metal electrode active material. In some embodiments, the lithium carbonate powder can be used to make a lithium transition metal electrode active material. In some embodiments, the lithium carbonate powder can be used to make a lithium metal phosphate electrode (e.g., cathode) active material. In some embodiments, the lithium carbonate powder can be used to make a lithium metal oxide electrode (e.g., cathode) active material.

Forming Electrode Active Material Precursor from Metal Precursor

In some embodiments, making a cathode active material precursor from lithium carbonate can include a step of mixing the lithium carbonate with at least one metal precursor.

In some embodiments, the lithium carbonate disclosed herein can be mixed with a stoichiometric amount of at least one metal precursor. In some embodiments, the metal precursor is a transition metal precursor. In some embodiments, the metal precursor can be a compound or a mixture of compounds each having the formula (4):

$$q\text{FePO}_4 \cdot (1-q)\text{A}_x\text{B}_y(\text{PO}_4)_{1-k} \quad (4)$$

in which A=Fe, Mn, Co, and/or Ni; B=Mg, Al, Ti, Zr, Nb, and/or W; x+y=1; 0≤y≤0.1; 0≤q≤1; and 0≤k≤0.2.

In some embodiments, the metal precursor can be a compound or a mixture of compounds each having the formula 1 or an oxide counterpart thereof:

$$q\text{Mn(OH)}_2 \cdot (1-q)\text{Ni}_a\text{Mn}_b\text{Co}_c\text{M}_y\text{X}_{1+k} \quad (1)$$

wherein 0≤q≤0.8, c=1−a−b, 0≤a≤1, 0<b≥1, 0≤y≤0.05 and M includes one or more selected from the group consisting of Al, Mg, Ti, Mo, Nb, Zr, Hf, Ta, W, B, P and F; wherein X is selected from the group consisting of $\text{OH}^-$, $\text{CO}_3^{2-}$, $\text{NO}_3^-$, $\text{SO}_4^{2-}$, $\text{C}_2\text{O}_4^{2-}$, $\text{C}_2\text{H}_3\text{O}_2^-$, $\text{CHO}_2^-$, stearate, oleate, tartrate and lactate, and −0.025≤k≤1.25. In some embodiments, metal precursors can include, but are not limited to, $\text{Ni}_x\text{Co}_y\text{Mn}_z(\text{OH})_2$, $\text{Ni}_x\text{Co}_y\text{Mn}_z(\text{OOH})_2$, $\text{Ni}_x\text{Co}_y\text{Mn}_z\text{O}_2$, and/or $\text{Ni}_x\text{Co}_y\text{Mn}_z(\text{OOH})_3$. Non-limiting examples of metal precursors include $\text{Ni}_{0.6}\text{Mn}_{0.2}\text{Co}_{0.2}(\text{OH})_2$, $\text{Ni}_{0.82}\text{Mn}_{0.06}\text{Co}_{0.12}(\text{OH})_2$, $\text{Ni}_{0.88}\text{Co}_{0.06}\text{Mn}_{0.03}\text{Al}_{0.03}(\text{OH})_2$, and the like. Non-limiting examples of oxide counterparts of the metal precursors include $\text{Ni}_{0.6}\text{Mn}_{0.2}\text{Co}_{0.2}\text{O}$, $\text{Ni}_{0.82}\text{Mn}_{0.06}\text{Co}_{0.12}\text{O}$, $\text{Ni}_{0.88}\text{Co}_{0.06}\text{Mn}_{0.03}\text{Al}_{0.03}\text{O}$, and the like.

In some embodiments, the metal precursor can be a compound or a mixture of compounds each having the formula 2 or an oxide counterpart thereof:

$$(\text{Ni}_x\text{Co}_y\text{Mn}_z)\text{A}_b \quad (2)$$

in which x+y+z=1; A=$\text{OH}^-$, $\text{OOH}^-$, $\text{CO}_3^{2-}$ and/or $\text{C}_2\text{O}_4^{2-}$; b=2 when A=$\text{OH}^-$ and/or $\text{OOH}^-$, otherwise b=1.

In some embodiments, the mixture of the lithium carbonate and the at least one metal precursor can also include a carbon source. In some embodiments, the carbon source can include glucose, sucrose, dextran, other carbohydrates, polymers, organic acids (e.g., citric acid and/or oxalic acid), or combinations thereof.

In some embodiments, the mixture of the lithium carbonate and the at least one metal precursor can also include a solvent. In some embodiments, the solvent can be isopropanol, acetone, water, or combinations thereof.

In some embodiments, the mixture can be milled. In some embodiments, the mixture can be mixed by a ball mill, mortar and pestle, acoustic mixer, and/or a mechanical mixer. In some embodiments, mixture can be dried prior to heat treatment (e.g., calcination.)

In some embodiments, the metal precursor(s), the carbon source(s), and/or the lithium carbonate can be in an aqueous form or dissolved in a solution. For example, in some embodiments, the lithium carbonate may be dissolved in the solvent or in solution. In some embodiments, the metal precursor may be dissolved in a solvent or in solution form. In some embodiments, the mixture can be formed by adding the lithium carbonate to a metal precursor solution. In some embodiments, adding lithium carbonate to the metal precursor solution can precipitate out the electrode active material precursor from the metal precursor solution. In some embodiments, the mixture can be dried. In some embodiments, the electrode active material precursor can be dried. In some embodiments, the mixture can be spray dried to form the electrode active material precursor.

The proportions of the metal precursor(s) and lithium carbonate disclosed herein may vary. In some embodiments, the moles of lithium are equal to or exceed the total aggregate moles of nickel, manganese, cobalt, and/or iron in the mixture. In some embodiments, the mixing can be conducted under an atmosphere in which the moisture levels are minimized (e.g., less than 3% by weight). In some embodiments, the mixing can be conducted at various temperature and pressures such as at or within typical Earth ambient temperature and pressure conditions.

Forming Electrode Active Material Precursor from Metal Source and Phosphate Source In some embodiments, making a cathode active material precursor from lithium carbonate can include a step of mixing the lithium carbonate with at least one metal source and a phosphate source. In some embodiments, the lithium carbonate disclosed herein can be mixed with a stoichiometric amount of at least one metal source (and phosphate source). In some embodiments, the metal source can include an iron source, a cobalt source, a manganese source, and/or a nickel source. In some embodiments, the iron source can include $\text{Fe}_2\text{O}_3$, Fe, $\text{Fe}_3\text{O}_4$, $\text{Fe}(\text{CH}_3\text{COO})_2$, $\text{FeC}_2\text{O}_4$, $\text{FeSO}_4$, $\text{Fe}(\text{NO}_3)_3$, or combinations thereof. In some embodiments, the manganese source can include $\text{MnCO}_3$, $\text{MnO}_2$, $\text{Mn}_3\text{O}_4$, or combinations thereof. In some embodiments, the cobalt source can include $\text{Co}_3\text{O}_4$, CoO, or combinations thereof. In some embodiments, the nickel source can include $\text{Ni(OH)}_2$, NiO, $\text{NiCO}_3$, or combinations thereof. In some embodiments, the phosphate source can be $\text{H}_3\text{PO}_4$, $\text{NH}_4\text{H}_2\text{PO}_4$, $(\text{NH}_4)_2\text{HPO}_4$, $(\text{NH}_4)\text{PO}_4$, or combinations thereof.

In some embodiments, the mixture of the lithium carbonate, the at least one metal source, and the phosphate source can also include a carbon source. In some embodiments, the carbon source can include be glucose, sucrose, dextran, other carbohydrates, polymers, organic acids (e.g., citric acid and/or oxalic acid), or combinations thereof.

In some embodiments, the mixture can be milled. In some embodiments, the mixture can be mixed by a ball mill, mortar and pestle, acoustic mixer, and/or a mechanical mixer.

In some embodiments, the mixture of the lithium carbonate, the at least one metal source, and the phosphate source can also include a solvent. In some embodiments, the solvent can be isopropanol, acetone, water, or combinations thereof.

In some embodiments, the phosphate source(s), the metal source(s), the carbon source(s), and/or the lithium carbonate can be in an aqueous form or dissolved in a solution. For example, in some embodiments, the lithium carbonate may be dissolved in the solvent or in solution. In some embodiments, the phosphate source may be dissolved in a solvent or in solution form. In some embodiments, the metal source may be dissolved in a solvent or in solution form. In some embodiments, the mixture can be formed by mixing a phosphate source and a metal source together to form a first solution and then adding the lithium carbonate to the first solution. In some embodiments, adding lithium carbonate to the first solution can precipitate out the electrode active material precursor from the first solution.

In some embodiments, the mixture can be dried. In some embodiments, the electrode active material precursor can be dried. In some embodiments, the mixture can be spray dried to form the electrode active material precursor.

The proportions of the metal source(s) and lithium carbonate disclosed herein may vary. In some embodiments, the moles of lithium are equal to or exceed the total aggregate moles of nickel, manganese, cobalt, and/or iron in the mixture. In some embodiments, the mixing can be conducted under an atmosphere in which the moisture levels are minimized (e.g., less than 3% by weight). In some embodiments, the mixing can be conducted at various temperature and pressures such as at or within typical Earth ambient temperature and pressure conditions.

Heat Treatment of Electrode Active Material Precursor

After forming the electrode active material precursor, the electrode active material precursor can be heated (e.g., calcined.). In some embodiments, the electrode active material precursor is the mixture described above of lithium carbonate and the at least one metal precursor. In some embodiments, the electrode active material precursor is the mixture described above of the lithium carbonate, metal source(s), and the phosphate source. In some embodiments, the electrode active material precursor can be the dried electrode active material precursor (e.g., spray dried electrode active material precursor).

In some embodiments, during the heating process, the metal precursor can be oxidized at high temperature and the lithium from the lithium carbonate can diffuse into the layered metal oxide framework to form the electrode (e.g., cathode) active material. In some embodiments (for LFP), during the heating process, metal (e.g., iron) phosphate can be "reduced" at high temperature and lithium from lithium carbonate can diffuse into the polyhedron $PO_4$ phosphate framework to form the electrode active material.

In some embodiments, the electrode active material precursor may be heated (e.g., calcinated) at a peak temperature between 500 and 1200° C., between 600° C. and 1100° C., between 750° C. and 1000° C., or between 600° C. and 800° C. In some embodiments, the electrode active material precursor may be heated at a peak temperature less than or equal to 1200° C., less than or equal to 1100° C., less than or equal to 1000° C., less than or equal to 900° C., less than or equal to 800° C., less than or equal to 750° C., less than or equal to 700° C., or less than or equal to 650° C. In some embodiments, electrode active material precursor may be heated at a peak temperature greater than or equal to 500° C., greater than or equal to 600° C., greater than or equal to 650° C., greater than or equal to 700° C., greater than or equal to 750° C., greater than or equal to 800° C., greater than or equal to 900° C., greater than or equal to 1000° C., or greater than or equal to 1100° C. These temperature ranges can also encompass circumstances where the heating step (e.g., calcining step) is conducted at a series of different temperatures (e.g., an initial calcining temperature, a peak calcining temperature, and/or a gradient of temperatures between initial and peak that change with time), instead of a single fixed temperature, falling within the respective ranges. For example, the heating step can start at an initial temperature, and subsequently, the temperature of the heating step can be increased to the peak heating temperature.

In some embodiments, the duration of the heating step is not necessarily limited to any particular period of time. In some embodiments, the electrode active material precursor may be heated (e.g., calcinated) between 30 minutes and 20 hours, between 1 hour and 15 hours, between 5 hours and 15 hours, or between 2 hours and 12 hours. In some embodiments, the electrode active material precursor may be heated for less than or equal to 20 hours, 15 hours, 12 hours, 10 hours, 8 hours, 6 hours, 5 hours, 4 hours, 3 hours, 2 hours, or 1 hour. In some embodiments, the electrode active material precursor may be heated for greater than or equal to 30 minutes, 1 hour, 2 hours, 3 hours, 4 hours, 5 hours, 6 hours, 8 hours, 10 hours, 12 hours, or 15 hours.

In some embodiments, the heating step (e.g., calcination) can take place in a furnace or kiln. In some embodiments, the heating step can be performed in an inert (e.g., nitrogen, argon, etc.) atmosphere, under inert gas flow, under a reducing atmosphere (e.g., hydrogen), under reducing gas flow, or combinations thereof. In some embodiments, the heating step can be performed under air flow.

In some embodiments, the electrode (e.g., cathode) active material formed after heating can include lithium and at least one metal (e.g., iron, cobalt, manganese, and/or a nickel). In some embodiments, the electrode active material can be a compound having the formula (5):

$$qLiFePO_4 \cdot (1-q)LiA_xB_y(PO_4) \qquad (5)$$

wherein A=Fe, Mn, Co, and/or Ni; B=Mg, Al, Ti, Zr, Nb, and/or W; x+y=1; 0≤y≤0.1; 0≤q≤1. In some embodiments, the electrode active material can include lithium iron phosphate (LFP) and/or lithium iron manganese phosphate (LMFP).

In some embodiments, the electrode active material can be a compound having the formula (3):

$$qLi_2MnO_3 \cdot (1-q)LiNi_aMn_bCo_cM_yO_{2+z} \qquad (3)$$

wherein 0≤q≤0.8, c=1−a−b, 0≤a≤1, 0<b≤1, 0≤y≤0.05, −0.025≤z≤0.125, and M is selected from the group consisting of Al, Mg, Ti, Mo, Nb, Zr, Hf, Ta, W, B, P, F and a combination of any two or more of the foregoing.

Electrode Manufacturing

In some embodiments, the electrode (e.g., cathode) active material can be used to make an electrode. In some embodiments, the electrode can be formed by mixing the electrode active material, conductive additive(s), binder(s), and/or solvent to form a slurry. In some embodiments, the conductive additives can include carbon black, vapor grown carbon fiber (VGCF), graphite, graphene, and/or carbon nanotubes. In some embodiments, the binder can include polyvinylidene fluoride (PVDF), carboxymethoxy cellulose (CMC), lithium substituted polyacrylic acid (LiPAA). In some embodiments, the solvent can include N-Methyl-2-pyrrolidone (NMP), water, another aqueous solution, or combinations thereof.

In some embodiments, the slurry includes about 80-95 wt. % electrode active material described herein. In some embodiments, the slurry may include less than or equal to 98 wt. %, less than or equal to 97 wt. %, less than or equal to 95 wt. %, less than or equal to 90 wt. %, or less than or equal to 85 wt. % electrode active material described herein. In some embodiments, the slurry includes about greater than or equal to 80 wt. %, greater than or equal to 85 wt. %, greater than or equal to 90 wt. %, greater than or equal to 95 wt. %, greater than or equal to 96 wt. %, greater than or equal to 97 wt. %, greater than or equal to 98 wt. % electrode active described herein.

In some embodiments, the slurry includes 0.1-10 wt. % conductive additives. In some embodiments, the slurry may include less than or equal to 10 wt. %, less than or equal to 9 wt. %, less than or equal to 8 wt. %, less than or equal to 7 wt. %, less than or equal to 6 wt. %, less than or equal to 5 wt. %, less than or equal to 4 wt. %, less than or equal to 3 wt. %, less than or equal to 2 wt. %, or less than or equal to 1 wt. % conductive additives. In some embodiments, the slurry may include greater than or equal to 0.1 wt. %, greater than or equal to 1 wt. %, greater than or equal to 2 wt. %, greater than or equal to 3 wt. %, greater than or equal to 4 wt. %, greater than or equal to 5 wt. %, greater than or equal to 6 wt. %, greater than or equal to 7 wt. %, greater than or equal to 8 wt. %, or greater than or equal to 9 wt. % conductive additives.

In some embodiments, the slurry includes 0.1-10 wt. % binder(s). In some embodiments, the slurry may include less than or equal to 10 wt. %, less than or equal to 9 wt. %, less than or equal to 8 wt. %, less than or equal to 7 wt. %, less than or equal to 6 wt. %, less than or equal to 5 wt. %, less than or equal to 4 wt. %, less than or equal to 3 wt. %, less than or equal to 2 wt. %, or less than or equal to 1 wt. % binder(s). In some embodiments, the slurry may include greater than or equal to 0.1 wt. %, greater than or equal to 1 wt. %, greater than or equal to 2 wt. %, greater than or equal to 3 wt. %, greater than or equal to 4 wt. %, greater than or equal to 5 wt. %, greater than or equal to 6 wt. %, greater than or equal to 7 wt. %, greater than or equal to 8 wt. %, or greater than or equal to 9 wt. % binder(s).

In some embodiments, the slurry can include solvent such that the solids content is about 5-85 wt. % of the slurry.

In some embodiments, the slurry can be coated onto a current collector by any method typically used in the art. In some embodiments, the current collector can be a metal foil. In some embodiments, the current collector can be an aluminum current collector. In some embodiments, the aluminum current collector can include aluminum metal, etched aluminum, carbon coated aluminum, or combinations thereof. The coating can then be dried and the coated current collector can be pressed or calendared to form the electrode (e.g., cathode).

In some embodiments, the electrode may comprise 0.1-10 wt. % conductive additive(s). In some embodiments, the electrode may comprise less than or equal to 10 wt. %, less than or equal to 9 wt. %, less than or equal to 8 wt. %, less than or equal to 7 wt. %, less than or equal to 6 wt. %, less than or equal to 5 wt. %, less than or equal to 4 wt. %, less than or equal to 3 wt. %, less than or equal to 2 wt. %, or less than or equal to 1 wt. % conductive additive(s). In some embodiments, the electrode may comprise greater than or equal to 0.1 wt. %, greater than or equal to 1 wt. %, greater than or equal to 2 wt. %, greater than or equal to 3 wt. %, greater than or equal to 4 wt. %, greater than or equal to 5 wt. %, greater than or equal to 6 wt. %, greater than or equal to 7 wt. %, greater than or equal to 8 wt. %, or greater than or equal to 9 wt. % conductive additive(s).

In some embodiments, the electrode may comprise 0.1-10 wt. % binder(s). In some embodiments, the electrode may comprise less than or equal to 10 wt. %, less than or equal to 9 wt. %, less than or equal to 8 wt. %, less than or equal to 7 wt. %, less than or equal to 6 wt. %, less than or equal to 5 wt. %, less than or equal to 4 wt. %, less than or equal to 3 wt. %, less than or equal to 2 wt. %, or less than or equal to 1 wt. % binder(s). In some embodiments, the electrode may comprise greater than or equal to 0.1 wt. %, greater than or equal to 1 wt. %, greater than or equal to 2 wt. %, greater than or equal to 3 wt. %, greater than or equal to 4 wt. %, greater than or equal to 5 wt. %, greater than or equal to 6 wt. %, greater than or equal to 7 wt. %, greater than or equal to 8 wt. %, or greater than or equal to 9 wt. % binder(s).

In some embodiments, the electrode may comprise 80-99.8 wt. % the electrode (e.g., cathode) active material described herein. In some embodiments, the electrode may comprise less than or equal to 99.8 wt. %, less than or equal to 99.5 wt. %, less than or equal to 99 wt. %, less than or equal to 98 wt. %, less than or equal to 97 wt. %, less than or equal to 95 wt. %, less than or equal to 90 wt. %, or less than or equal to 85 wt. % the electrode (e.g., cathode) active material described herein. In some embodiments, the electrode may comprise greater than or equal to 80 wt. %, greater than or equal to 85 wt. %, greater than or equal to 90 wt. %, greater than or equal to 95 wt. %, greater than or equal to 96 wt. %, greater than or equal to 97 wt. %, greater than or equal to 98 wt. %, greater than or equal to 99 wt. %, or greater than or equal to 99.5 wt. % the electrode (e.g., cathode) active material described herein.

In some embodiments, the electrode (e.g., cathode) can be used in a battery (e.g., a lithium-ion battery). In some embodiments, the lithium carbonate powder disclosed herein can be used to make an electrolyte. In some embodiments, the battery can include an anode, a cathode, a separator, and/or an electrolyte. In some embodiments, the battery can be a solid-state battery.

For the purpose of clarity and a concise description, features are described herein as part of the same or separate embodiments; however, it will be appreciated that the scope of the disclosure includes embodiments having combinations of all or some of the features described.

EXAMPLES

The following examples are presented for purposes of illustration, and are not intended to impose limitations on the scope of this disclosure.

Applicant initially discovered that the reaction kinetics of the reaction of lithium hydroxide monohydrate to lithium carbonate and/or lithium bicarbonate relates to or correlates to the carbon dioxide concentration of the gas or atmosphere during mill. The theoretical reaction of lithium hydroxide monohydrate with carbon dioxide to form lithium carbonate and water has an 88% solid yield. The theoretical reaction of lithium hydroxide monohydrate with carbon dioxide to form lithium bicarbonate and water has a 162% solid yield.

Figure 3:
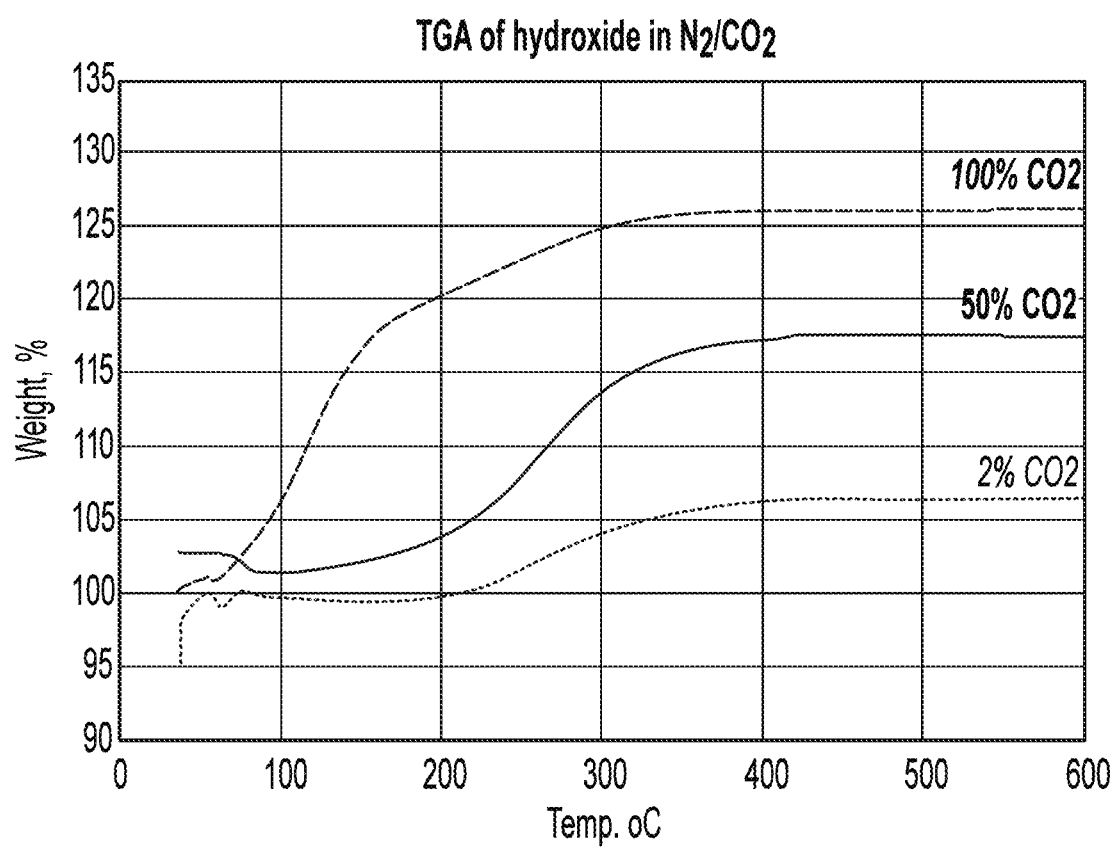
FIG. 3 illustrates a thermogravimetric analysis of lithium hydroxide monohydrate in atmospheres with varying concentrations of carbon dioxide in accordance with some embodiments disclosed herein.

Applicant ran a thermogravimetric analysis (TGA) to identify the kinetic parameters of the reaction between lithium hydroxide monohydrate and carbon dioxide by varying the amount of carbon dioxide in the reaction gas. The reaction gas used was a mixture of nitrogen and carbon dioxide. FIG. 3 is a thermogravimetric analysis of lithium hydroxide monohydrate in an atmosphere of gas containing varying levels of carbon dioxide (e.g., 2%, 5%, and 100% $CO_2$). As shown in FIG. 3, there was a plateau between 88-162% solid yield suggesting the formation of both carbonate and bicarbonate. At low carbon dioxide content (e.g., 2-5%), slow weight gain was observed suggesting slow lithium carbonate and/or bicarbonate formation. At high carbon dioxide content (e.g., 100%), quick weight gain was observed suggesting fast lithium carbonate and/or bicarbonate formation. When 100% carbon dioxide was used in the thermogravimetric analysis, an explosive reaction was observed. This result may be a bit inconclusive because powder was blown out of the pan due to the explosiveness of the reaction.

Applicant also demonstrated conversion of lithium hydroxide monohydrate to lithium carbonate by retrofitting a jet mill with 100% carbon dioxide gas. Specifically, 40.07 g of LiOH—H2O was weighed out. A jet mill (Jet Pulverizer Co. model 02-606 Micron-Master) was wrapped with heat tape on top of the mill, under the mill, and around the product exit tube. The mill was heated to 90-110° C., measured with a Type K wire thermocouple on the top of the mill, and set up to run with 100% CO2 as the gas supply. The gas pressure was set to 115 psig, the feed rate was set to 350 (unitless control setting corresponding to percentage of powder being applied to the auger so a value of 500 would correspond to 50% power or half its top speed), and the addition was started. Total milling time was approximately 3 minutes. After all the LiOH—H2O was milled, the mill was turned off and 35.61 g of moist Li2CO3 was collected. The resulting Li2CO3 was dried at 150° C. under vacuum for 16 hours. 24.56 g of Li2CO3 was collected after drying. A portion of dried Li2CO3 were analyzed using XRD on a Bruker D8 Advance with copper source. Rietveld refinement was conducted to fit the spectrum and calculate the Li2CO3 content. And it shows the dried powder is phase pure Li2CO3.

Applicant also demonstrated the high conversion rate of lithium hydroxide monohydrate to lithium carbonate by retrofitting the jet mill using a gas with varying levels of carbon dioxide concentration, feed, and pressure. The results of such jet milling conditions are shown in Table 1 below:

TABLE 1

| Sample | Starting Lithium Hydroxide Type | % CO2 in jet mill gas | Feed (unit less control setting) | Pressure (psig) | Conversion to lithium carbonate (%) | Percent lithium carbonate (%) |
| --- | --- | --- | --- | --- | --- | --- |
| 1 | Monohydrate | 25 | 350 | 60 | 51.5 | 48.3 |
| 2 | Monohydrate | 25 | 350 | 90 | 66.0 | 63.1 |
| 3 | Monohydrate | 25 | 650 | 90 | 49.3 | 46.1 |
| 4 | Monohydrate | 25 | 250 | 115 | 56.4 | 53.3 |
| 5 | Monohydrate | 25 | 350 | 90 | 50.8 | 47.6 |
| 6 | Monohydrate | 25 | 650 | 90 | 44.8 | 41.7 |
| 7 | Monohydrate | 25 | 250 | 90 | 87.9 | 86.5 |
| 8 | Anhydrous | 25 | 250 | 70-80 | 84.3 | 82.5 |
| 9 | Monohydrate | 50 | 350 | 95 | 91.8 | 90.8 |
| 10 | Monohydrate | 50 | 350 | 95 | 100.0 | 100 |
| 11 | Anhydrous | 50 | 350 | 90 | 95.7 | 95.2 |
| 12 | Anhydrous | 50 | 350 | 90 | 98.4 | 98.2 |
| 13 | Monohydrate | 100 | 350 | 65 | 99.4 | 99.4 |
| 14 | Anhydrous | 100 | 350 | 40 | 36.9 | — |
| 15 | Monohydrate | 100 | 350 | 40 | 45.0 | — |
| 16 | Monohydrate | 100 | 350 | 115 | 100.0 | 100 |
| 17 | Monohydrate | 100 | 350 | 120 | 99 | 99 |
| 18 | Anhydrous | 25 | 250 | 85-90 | — | 84.5 |
| 19 | Monohydrate | 25 | 350 | 90 | — | 65.6 |
| 20 | Monohydrate | 50 | 350 | 85 | — | 81.2 |
| 21 | Monohydrate | 100 | 350 | 68 | — | 99.5 |
| 22 | Monohydrate | 100 | — | — | — | 99.4 |
| 23 | Monohydrate | 100 | 350 | 115 | — | 100 |
| 24 | Anhydrous | 100 | 350 | 115 | — | 97.1 |
| 25 | Monohydrate | 100 | 350 | 120 | — | 100 |
| 26 | Monohydrate | 100 | 350 | 105 | — | 100 |
| 27 | Anhydrous | 100 | 200 | 110 | — | 100 |
| 28 | Anhydrous | 100 | 350 | 115 | — | 99.7 |
| 29 | Anhydrous | 100 | 350 | 115 | — | 99.2 |
| 30 | Anhydrous | 100 | 350 | 115 | — | 98.5 |
| 31 | Anhydrous | 100 | 350 | 115 | — | 83.6 |
| 32 | Anhydrous | 100 | 350 | 115 | — | 98.2 |
| 33 | Anhydrous | 100 | 350 | 115 | — | 99.1 |
| 34 | Blend | 100 | 350 | 115 | — | 100 |
| 35 | Blend | 100 | 350 | 115 | — | 100 |
| 36 | Blend | 100 | 350 | 115 | — | 100 |
| 37 | Anhydrous | 100 | 350 | 115 | — | 98.2 |

Figure 4:
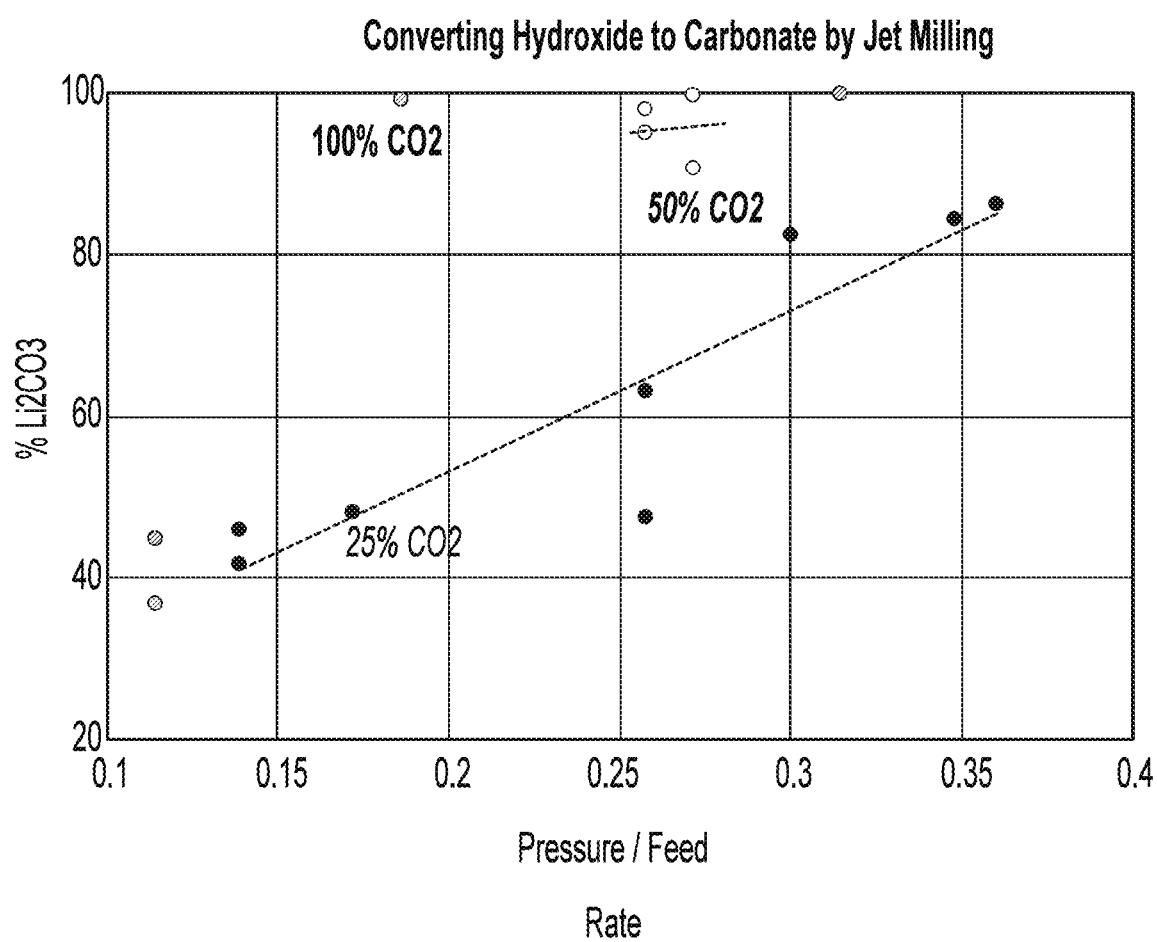
FIG. 4 illustrates a graph of the conversion of lithium hydroxide monohydrate to lithium carbonate during jet milling with varying concentrations of carbon dioxide gas in accordance with some embodiments disclosed herein.

As shown in the above table, lithium hydroxide monohydrate was fed into the jet mill at varying feed rates and the gas pressure was also varied throughout the experiments using a gas with a carbon dioxide concentration of 25%, 50%, and 100%. As shown in the table, the higher the carbon dioxide percentage the lower the pressure needed to achieve comparable conversion to lithium carbonate. FIG. 4 illustrates a graph of the conversion of lithium hydroxide monohydrate to lithium carbonate during jet milling. XRD and Titration confirmed the formation of carbonate (not bicarbonate) and also the carbonate content. As shown in FIG. 4 and the above table, a conversion rate as high as 100% has been demonstrated. In addition, it was shown that both gas pressure and the powder feed rate can have an impact on the conversion. As stated above the feed rate was a unitless control setting of the Jet Pulverizer Co. model 02-606 Micron-Master used to make the samples. The feed rate settings of 350 referred to a feed rate of about 1.05 g/second;

a feed rate setting of 500 referred to a feed rate of about 1.75 g/sec; and a feed rate setting of 750 referred to a feed rate of about 2.8 g/second.

A portion of the above Li2CO3 samples were analyzed with Micromeritics ASAP 2020 plus for the specific surface area. The samples were activated at 160° C. for 2 hours. The standard liquid nitrogen dosing method was adopted, and the surface area was calculated using the datapoints between 0.05 to 0.30 p/p0. The resultant surface area is listed in below Table. As shown, the BET specific surface areas were between 2-12 $m^2/g$. In addition, a portion of the above Li2CO3 samples were analyzed using a Malvern Mastersizer 3000 with wet module for the particle size distribution. Particle size distribution was collected by the wet method. Due to solubility in water, the dispersant was chosen to be mineral spirit. The sample was sonicated for 1 minute prior to the testing. The resultant particle size distribution is listed in below Table 2.

TABLE 2

| Sample | SSA ($m^2/g$) | D10 (microns) | D50 (microns) | D90 (microns) |
| --- | --- | --- | --- | --- |
| 12 | 10.64 | 2.1 | 6.63 | 13.2 |
| 13 | 6.67 | 2.69 | 11.9 | 23.3 |
| 16 | 2.92 | 1.17 | 8.51 | 18.6 |
| 17 | 4.74 | 1.18 | 10.2 | 28.4 |
| 23 | — | 1.32 | 9.88 | 24 |
| 24 | — | 1.56 | 6.52 | 18 |
| 26 | 3.4 | 1.38 | 10.3 | 25.4 |
| 27 | 11.5 | 1.86 | 7 | 18.8 |
| 31 | — | 1.83 | 9.07 | 33.2 |
| 33 | 7.7 | 1.44 | 6.29 | 16 |
| 34 | 8.8 | 1.55 | 6.39 | 16.7 |
| 35 | 8.6 | 1.59 | 6.4 | 17.1 |
| 36 | 9.1 | 1.67 | 6.79 | 17.9 |

Figure 10A:
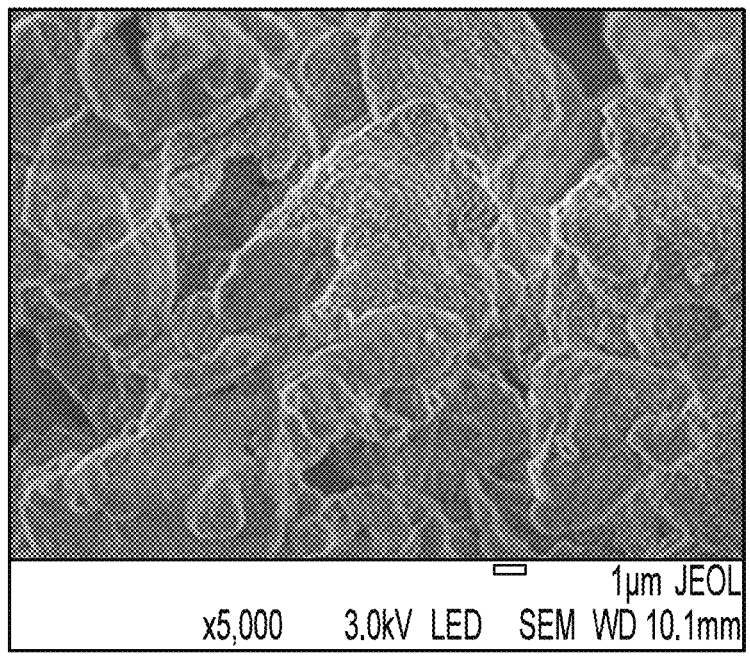
FIG. 10A illustrates an SEM image of lithium carbonate produced by jet milling lithium hydroxide monohydrate with a carbon dioxide containing gas in accordance with some embodiments disclosed herein.
Figure 10B:
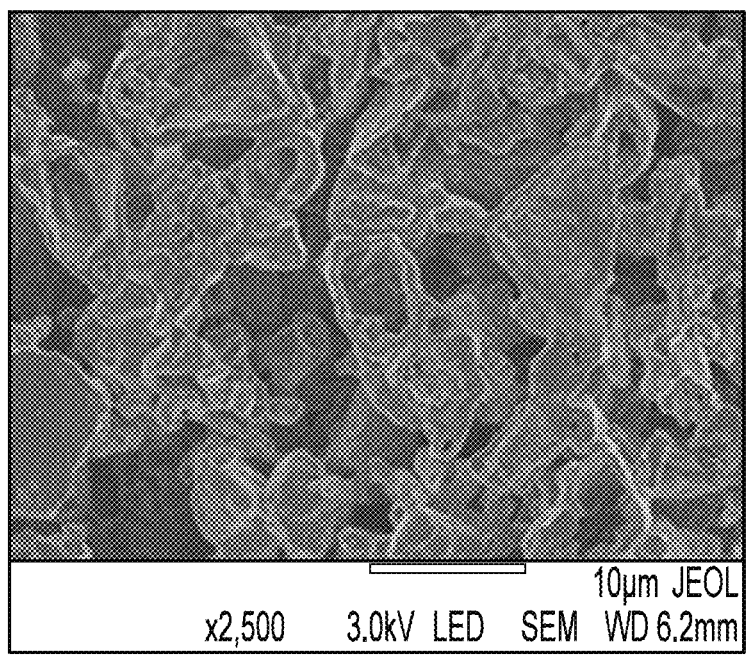
FIG. 10B illustrates an SEM image of a cross section of the lithium carbonate shown in FIG. 10A produced by jet milling lithium hydroxide monohydrate with a carbon dioxide containing gas in accordance with some embodiments disclosed herein.

Some of these samples were also analyzed by scanning electronic microscopy (SEM). SEM images were taken on Jeol JSM 7200F at 3 kV and at the working distance of 6 mm. Two of the resultant SEM images are shown in FIGS. 10A and 10B. Specifically, FIG. 10A shows the above Li2CO3 comprises micron-sized particles coated by nano-sized particles, and FIG. 10B shows that at least some of the micron-sized particles are hollow. The cross section of the lithium carbonate powder shown in FIG. 10B was obtained by cryo-polished-SEM. Essentially, the lithium carbonate powder was cooled down to very cold temperatures and an argon beam was used to cut the particles in half that had been sprayed on carbon tape so as to see a cross section of at least some of the particles showing a hollow micron-sized particles. When the lithium carbonate is formed, some water (gas or liquid) is also formed. Without being bound by any theory, Applicants believe the hollow portion is related to the generation of the water in the conversion to lithium carbonate.

Figure 9A:
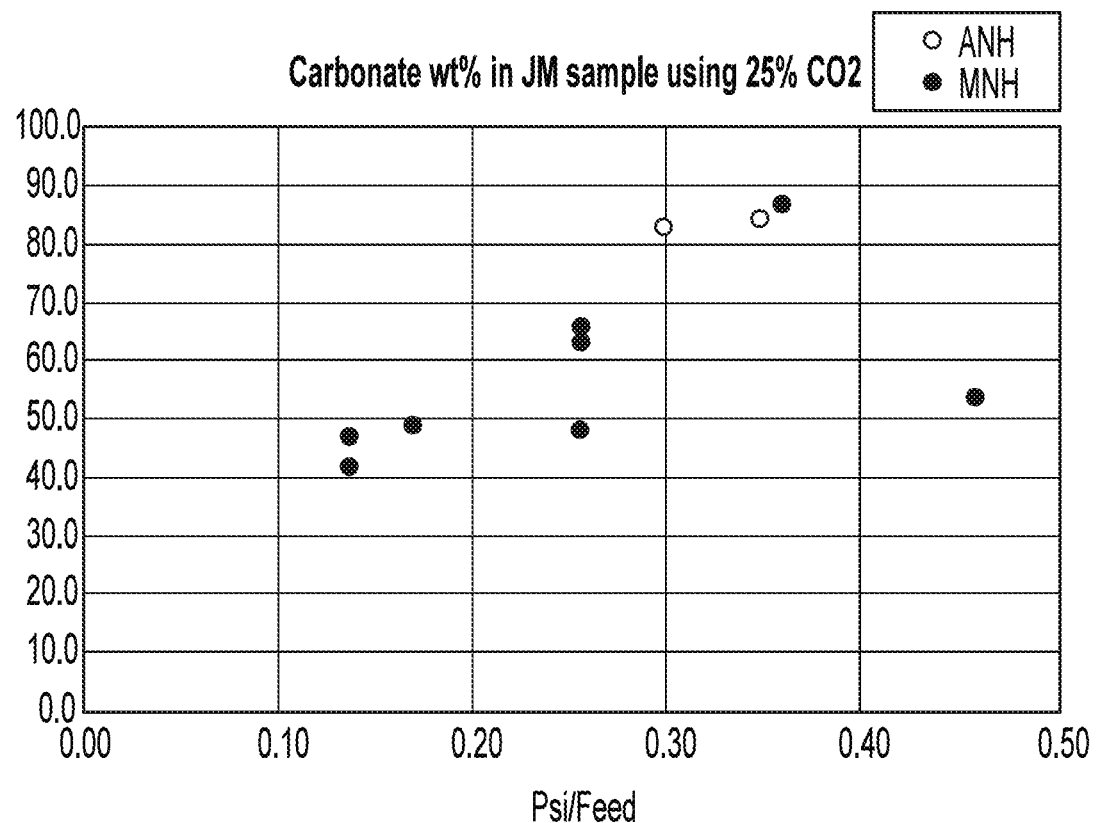
FIG. 9A illustrates a graph of the conversion of lithium hydroxide monohydrate and anhydrous lithium hydroxide to lithium carbonate during jet milling with a gas with a carbon dioxide concentration of 25% in accordance with some embodiments disclosed herein.
Figure 9B:
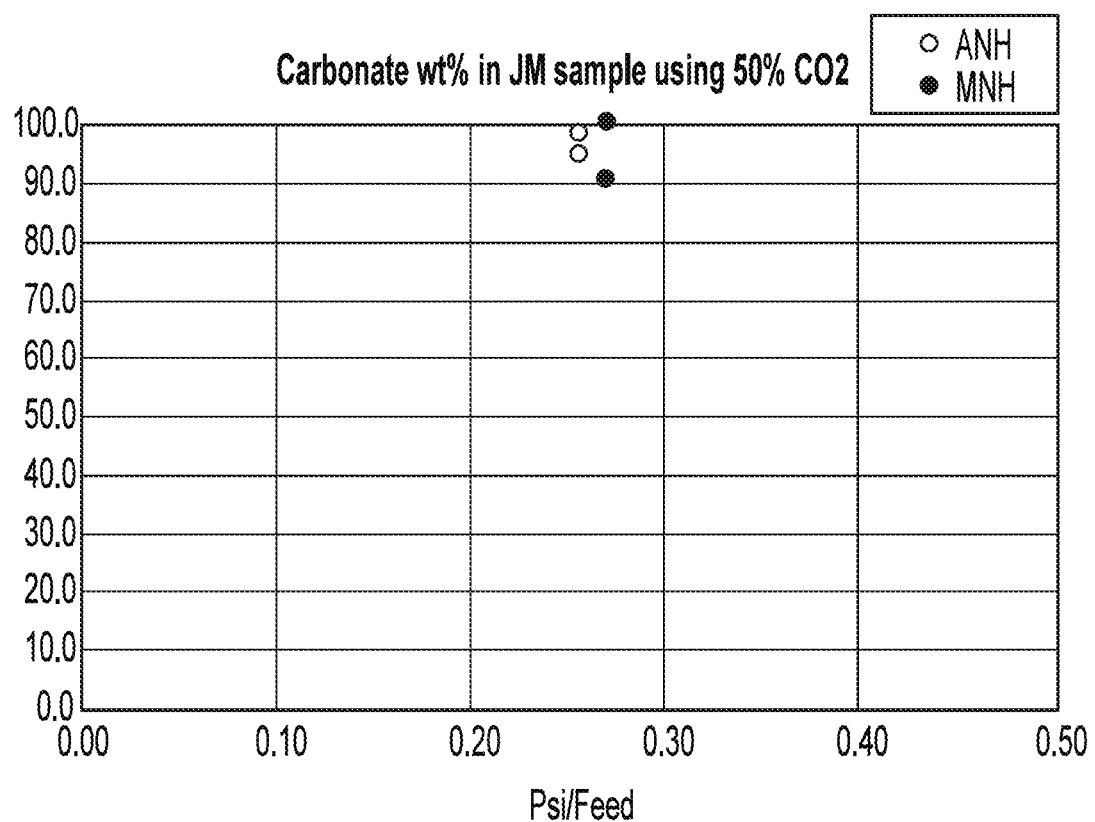
FIG. 9B illustrates a graph of the conversion of lithium hydroxide monohydrate and anhydrous lithium hydroxide to lithium carbonate during jet milling with a gas with a carbon dioxide concentration of 50% in accordance with some embodiments disclosed herein.

Besides lithium hydroxide monohydrate, anhydrous lithium hydroxide was also tested in the jet mill. FIG. 9A (using a gas with a carbon dioxide concentration of 25%) and 9B (using a gas with a carbon dioxide concentration of 50%) illustrates a graph of the conversion of lithium hydroxide monohydrate and anhydrous lithium hydroxide to lithium carbonate during jet milling. As shown in FIGS. 9A and 9B, there was an insignificant improvement on conversion between lithium hydroxide monohydrate and anhydrous lithium hydroxide with conversion of monohydrate being only slightly better.

Figure 5A:
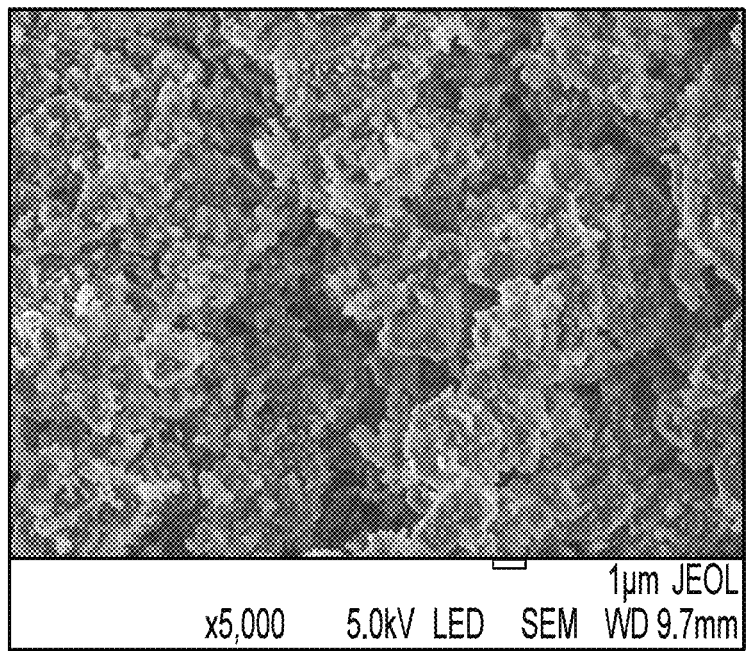
FIG. 5A illustrates an SEM image of lithium carbonate produced by jet milling lithium hydroxide monohydrate with a gas containing 50% carbon dioxide in accordance with some embodiments disclosed herein.
Figure 5B:
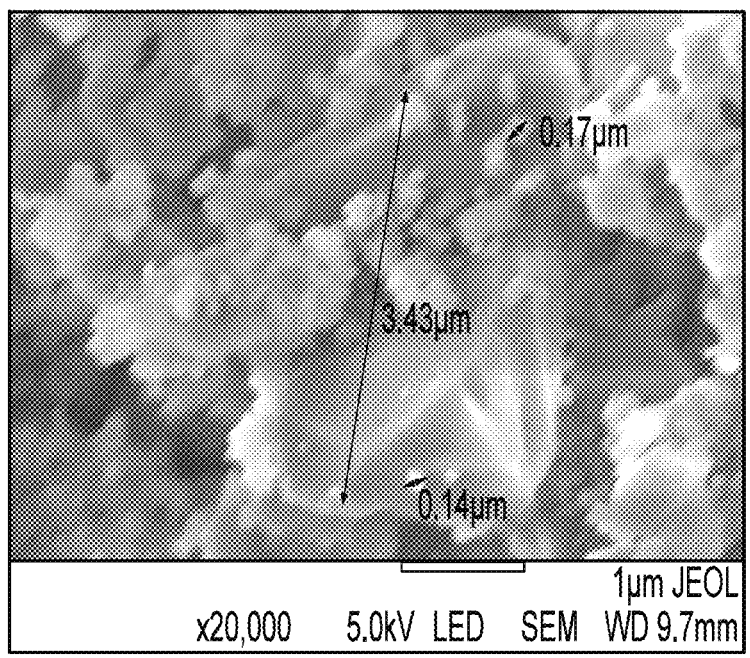
FIG. 5B illustrates a zoomed in SEM image of the lithium carbonate shown in FIG. 5A in accordance with some embodiments disclosed herein.
Figure 6A:
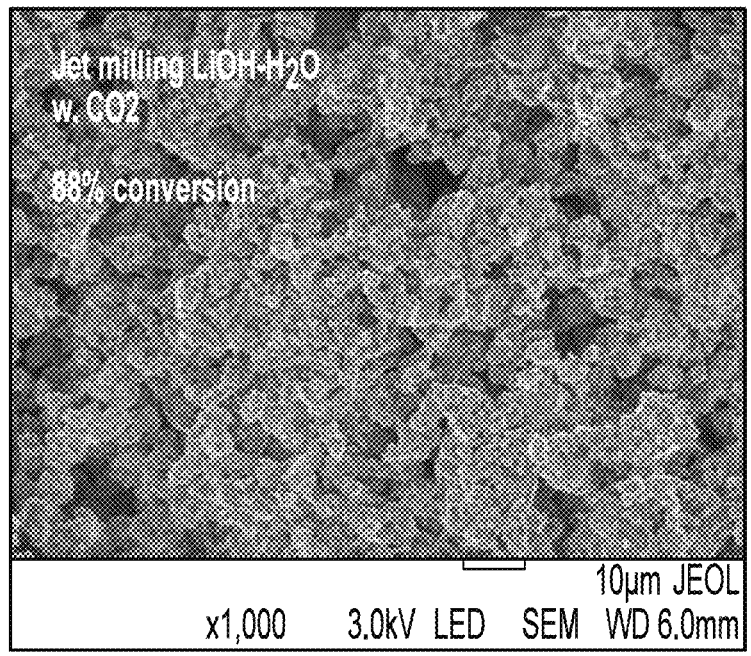
FIG. 6A illustrates an SEM image of lithium carbonate produced by jet milling lithium hydroxide monohydrate with a gas containing 25% carbon dioxide in accordance with some embodiments disclosed herein.
Figure 6B:
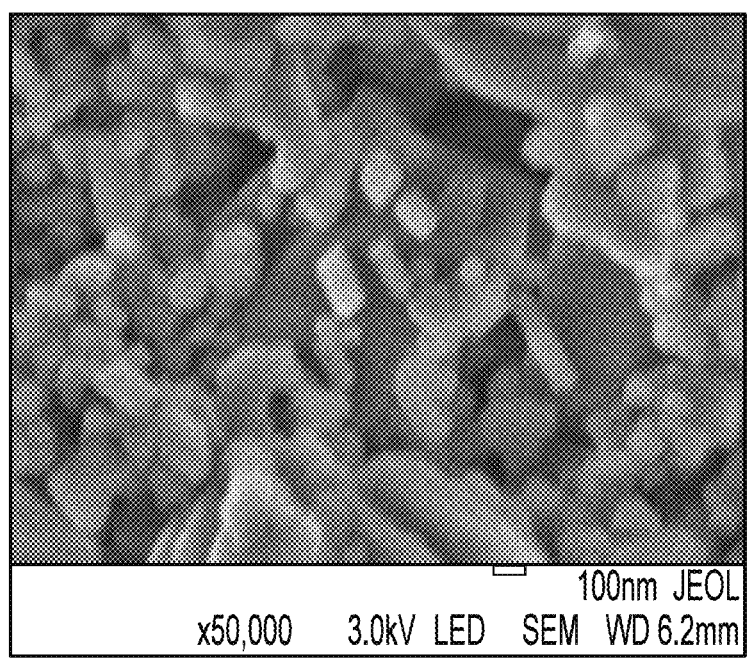
FIG. 6B illustrates a zoomed in SEM image of the lithium carbonate shown in FIG. 6A in accordance with some embodiments disclosed herein.
Figure 7A:
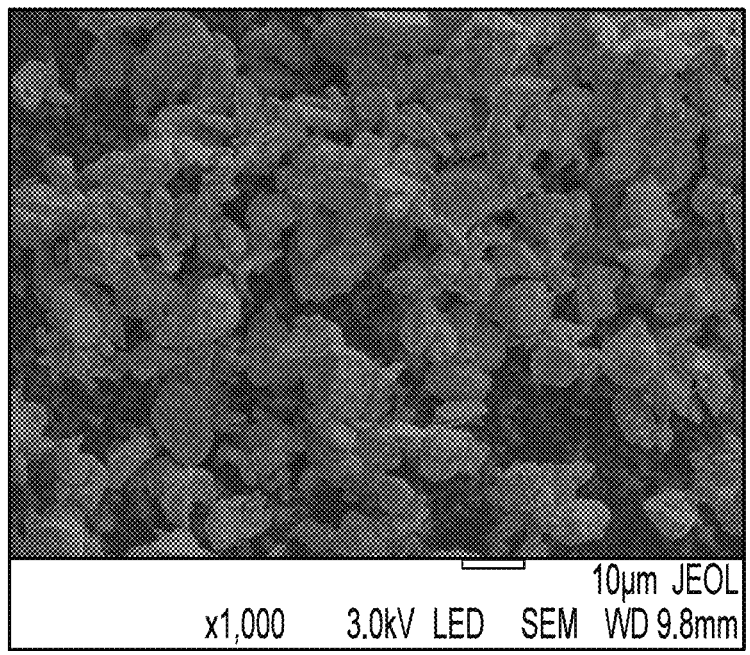
FIG. 7A illustrates a first SEM image of lithium carbonate produced from spodumene by the typical precipitation process.
Figure 7B:
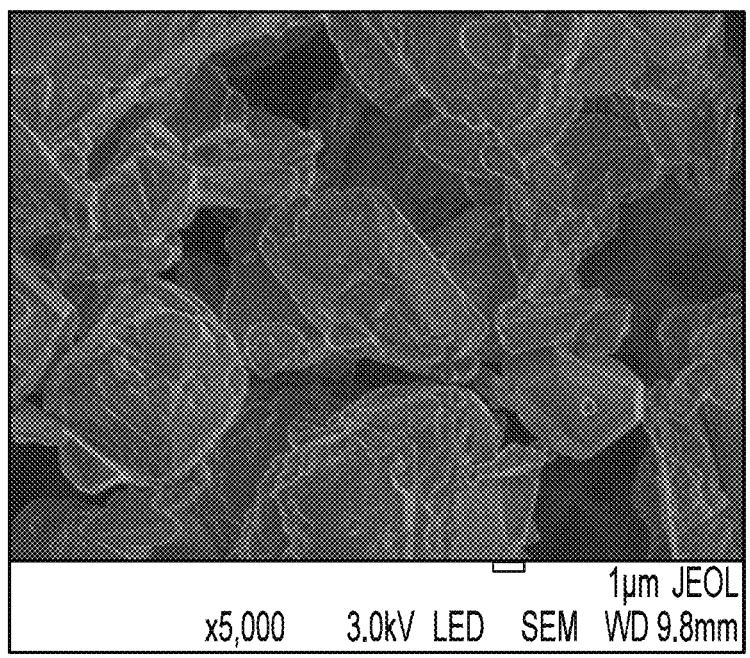
FIG. 7B illustrates a zoomed in SEM image of the lithium carbonate shown in FIG. 7A.
Figure 8A:
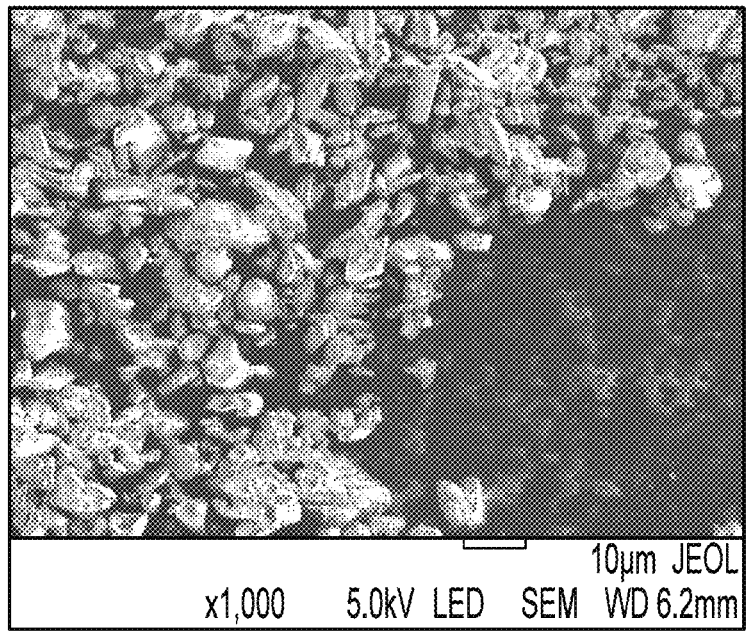
FIG. 8A illustrates a second SEM image of lithium carbonate produced from brine by the typical precipitation process.
Figure 8B:
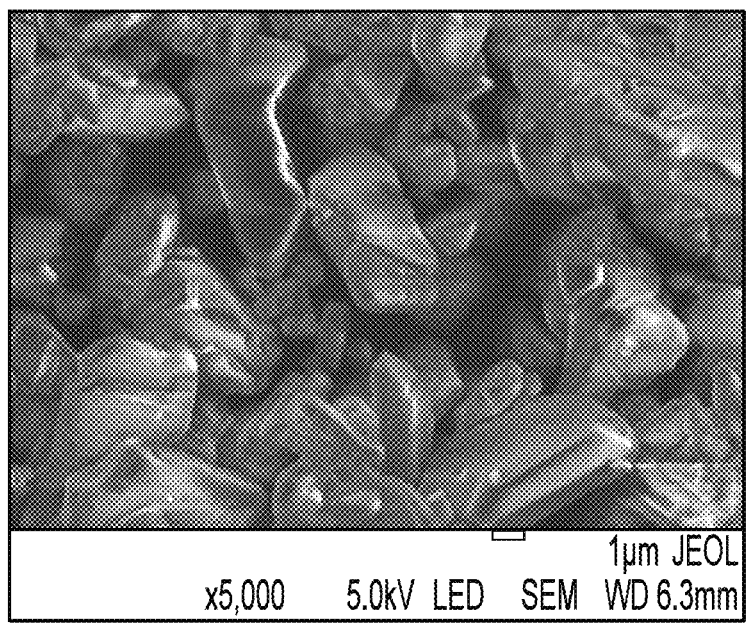
FIG. 8B illustrates a zoomed in SEM image of the lithium carbonate shown in FIG. 8A.

Applicant also observed a moist solid after jet milling, thereby suggesting that water condensed in the resultant solid. Without being bound by any theory, Applicant believes that condensed water formed from the conversion of lithium hydroxide to lithium carbonate may dissolve some of the carbon dioxide, thereby increasing the reaction of the carbon dioxide with the lithium hydroxide because it is dissolved in the water. Applicant believes that this can increase the amount of nano-sized lithium carbonate particles that coat the micron-sized lithium carbonate. FIG. 5A illustrates an SEM image of lithium carbonate produced by jet milling lithium hydroxide monohydrate with a gas that has a concentration of carbon dioxide of 50%. The conversion from lithium hydroxide to lithium carbonate in this example was 98%. FIG. 5B illustrates a zoomed in SEM image of the lithium carbonate shown in FIG. 5A. As seen in FIG. 5B, there are nano-sized particles on the surface of bigger micron-sized particles of lithium carbonate. FIG. 6A illustrates an SEM image of lithium carbonate produced by jet milling lithium hydroxide monohydrate with a gas that has a concentration of carbon dioxide of 25%. The conversion from lithium hydroxide to lithium carbonate in this example was 88%. FIG. 6B illustrates a zoomed in SEM image of the lithium carbonate shown in FIG. 6A. As seen in FIG. 6B, there are nano-sized particles on the surface of bigger micron-sized particles of lithium carbonate.

FIGS. 7A-7B and 8A-8B show SEM images of lithium carbonate made from two different processes. The samples shown in FIGS. 7A-7B were made by the following spodumene process. Spodumene was acid-treated first, the resultant leachate solution went through series of processes including refining, purifying, converting, precipitating processes, and ends at pure lithium carbonate. The samples shown in FIGS. 8A-8B were made by the following brine process. The brine goes through a series of processes, including concentration, purification, separation, precipitation, etc., and resulted as pure lithium carbonate. As seen in the SEM images of FIGS. 7A-8B, the final lithium carbonate powder from these methods is micron-sized and are not coated by nano-sized lithium carbonate particles.

Figure 11:
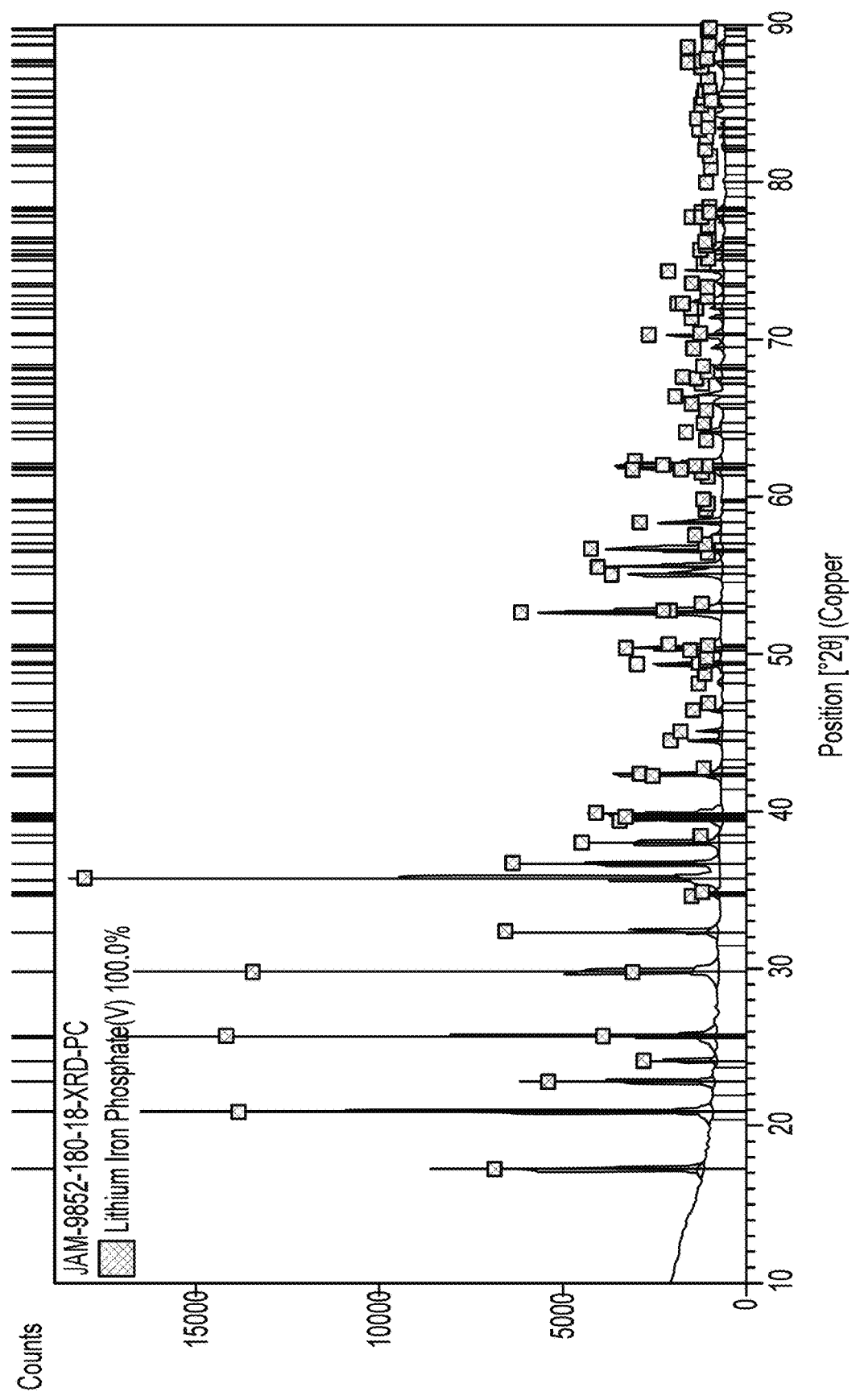
FIG. 11 illustrates an XRD scan of the example lithium iron phosphate LFP produced from the jet milled material with a reference pattern overlaid on it to show all the peaks aligning with a lithium iron phosphate reference in accordance with some embodiments disclosed herein.

Lithium Iron Phosphate Synthesis: A portion (2.98 g) of the dried Li2CO3 of sample 16 was weighed into a zirconium ball mill along with 15.03 g of FePO4, 1.43 g of glucose, and 37 mL of isopropanol. Approximately 20 mL of 0.5 mm Zr balls were added for grinding media and the jar was sealed. The mixture was milled in a Retsch PM-100 for 2.5 hours at 350 rpm with 2 minute intervals and a 30 second pause between each. The ball mill reversed directions for every interval. The ball milled slurry was dried at 100° C. for about 2 hours, until dry. The Zr grinding balls were separated from the precursor powder and 8 g of powder was put in an alumina crucible. The powder was then calcined in a tube furnace under a stream of argon gas. The calcination program was 2 hours at 500° C. then 10 hours at 725° C. with a 5° C./min heating ramp. After the resulting lithium iron phosphate powder had cooled it was removed from the furnace. The LFP powder was then ground by hand in a mortar and pestle and then sieved through a −325 mesh sieve. XRD was used to evaluate the phase purity and crystal quality. Using the lithium carbonate generated from jet milling process yielded phase pure lithium iron phosphate and refined against the standard LFP in the ICSD database (ICSD collection code: 162282), as shown in FIG. 11. Specifically, FIG. 11 is the XRD scan of the LFP powder produced from the jet milled sample and it has the reference pattern overlaid on it to show all the peaks align with the LFP reference. The particle size distribution for the LFP had a D10 of 0.022 microns, a D50 of 0.098 microns, and D90 of 20 microns.

Lithium Iron Phosphate Synthesis 2: A portion (3.008 g) of the dried Li2CO3 of sample 23 was weighed into a zirconium ball mill along with 15.01 g of FePO4, 1.064 g of glucose, and 30 mL of isopropanol. Approximately 20 mL of 0.5 mm Zr balls were added for grinding media and the jar was sealed. The mixture was milled in a Retsch PM-100 for 1.5 hours at 350 rpm with 2 minute intervals and a 30 second pause between each. The ball mill reversed directions for every interval. The ball milled slurry was dried at 90° C. for about 1 hour, until dry. The Zr grinding balls were separated from the precursor powder and 8 g of powder was put in an alumina crucible. The powder was then calcined in a tube furnace under a stream of argon gas. The calcination program was 2 hours at 500° C. then 10 hours at 725° C. with a 5° C./min heating ramp. After the resulting lithium iron phosphate powder had cooled it was removed from the furnace. The LFP powder was then ground by hand in a mortar and pestle and then sieved through a −325 mesh sieve. XRD was used to evaluate the phase purity and crystal quality. Using the lithium carbonate generated from jet milling process yielded phase pure lithium iron phosphate and refined against the standard LFP in the ICSD database (ICSD collection code: 162282).

Lithium iron phosphate Synthesis 3 (wet-processing method): Mix 14.439 g of 85% H3PO4 solution with 2.53 g citric acid and 6.34 g oxalic acid in a 250 ml 3-neck reactor followed by adding 10 g of $Fe_2O_3$ powders in the acid mixtures. The reactants are kept at 40° C. for 1 hr. 4.719 g of lithium carbonate of sample 27 is slowly added to the above solution over 10 mins followed by continuous stirring for 3 hrs. The reaction mixture is then spray-dried with inlet temperature and outlet temperature of 220 C and 110 C, respectively. The spray dry feeding rate is 15-18%. The powder was then calcined in a tube furnace under a stream of argon gas. The calcination program was 2 hours at 500° C. then 10 hours at 725° C. with a 5° C./min heating ramp. After the resulting lithium iron phosphate powder had cooled it was removed from the furnace. The LFP powder was then sieved through a −325 mesh sieve. XRD was used to evaluate the phase purity and crystal quality.

E-Chem Testing: A portion (1.12 g) of the LFP from the above examples was made into a slurry with the following ingredients: 90 wt % LFP; 5 wt % PVDF; 5 wt % carbon black; and NMP. The amount of NMP was such that the solid content was about 40 wt % of the slurry. The slurry was coated onto an aluminum foil current collector and then the coating was dried and then calendared to 40% porosity, forming an electrode. The loading of LFP on the electrode was about 8 mg/cm2. Four coin cells were assembled from each calendared electrode, with lithium foil as the counter electrode and 1.2 M LiPF6 (ethylene carbonate:diethyl carbonate=3:7) with 5% fluoroethylene carbonate as the electrolyte solution. The cells were cycled at C/20 for 10 cycles. The first cycle capacities and Coulombic efficiencies are summarized below in Table 3 below, which shows the LFP synthesized from above Li2CO3 has comparable battery performance to that of prior art Li2CO3.

TABLE 3

| | C/20 Ch (mAh/g) | C/20 DCh (mAh/g) | 1st cycle CE | C/20 DCh STDEV | C/20 Ch STDEV | 1st cycle CE STDEV |
|---|---|---|---|---|---|---|
| LFP (w/ benchmark lithium carbonate) | 157.7 | 147.9 | 93.8 | 0.7 | 0.6 | 0.1 |

TABLE 3-continued

| | C/20 Ch (mAh/g) | C/20 DCh (mAh/g) | 1st cycle CE | C/20 DCh STDEV | C/20 Ch STDEV | 1st cycle CE STDEV |
|---|---|---|---|---|---|---|
| LFP (w/lithium carbonate from example 16) | 159.7 | 154.1 | 96.5 | 5.8 | 5.5 | 0.8 |
| LFP (w/lithium carbonate from example 27) | 156.8 | 147.3 | 94.0 | 2.1 | 1.9 | 0.0 |
| LFP (w/lithium carbonate from example 23) | 160.8 | 150.8 | 93.8 | 2.4 | 2.5 | 0.2 |
| LFP (w/lithium carbonate from example 28) | 159.9 | 149.2 | 93.3 | 1.9 | 1.7 | 0.1 |
| LFP (w/lithium carbonate from example 36) | 160.1 | 149.7 | 93.5 | 1.4 | 1.1 | 0.1 |
| LFP (wet processing w/lithium carbonate from example 27) | 159.2 | 151.8 | 95.4 | 0.6 | 0.6 | 0 |

Conceptual $LiNi_xMn_yCo_zO_2$ Synthesis: The compounds can be synthesized from the metal-containing precursor $Ni_{0.6}Mn_{0.2}Co_{0.2}(OH)_2$ and Li2CO3 produced by the methods disclosed herein. Specifically, 10 grams $Ni_{0.6}Mn_{0.2}Co_{0.2}(OH)_2$ and the 4.2 grams $Li_2CO_3$ can be introduced at 1.05 Li to TM molar ratio into a plastic container for the acoustic mixing at progressively increasing forces of 50 times, 60 times and 70 times gravity, each for 1 min. After mixing, the mixture can be transferred to an alumina crucible and placed in a tube furnace under air flow. The $Ni_{0.6}Mn_{0.2}Co_{0.2}(OH)_2$ and $Li_2CO_3$ mixture can undergo heat treatment at 500° C. for 4 hours for oxidation, followed by being heated to 850° C. and held at 850° C. for 12 hours for calcination, the temperature ramping rate being 5° C./min. The X-ray powder diffraction (XRD) of the resultant powder can confirm the formation of $LiNi_{0.6}Mn_{0.2}Co_{0.2}O_2$ (NMC 622) with the layered structure.

Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

The terms "powders" and "particles" used herein are equivalent, except that a single powder refers to a plurality of particles. This disclosure can apply to a wide range of particles and powders.

As used herein, the word "layer(s)" and "coating(s)" are equivalent. Specifically, each term "layer(s)" or "coating(s)" as used in relation to a particle(s) indicates that at least a portion of the surface of such particle, substantially all, or all of the surface of such particle(s) is covered by or in contact with the "layer(s)" or "coating(s)." Similarly, the term "coated" in relation to a particle(s) indicates that at least a portion of the surface of the particle, substantially all, or all of the surface of the particle(s) is covered by or in contact with the substance(s) with which the particle(s) is said to be "coated."

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

The invention claimed is:

1. A method of producing lithium carbonate comprising: contacting a solid lithium precursor comprising lithium hydroxide with a gas comprising at least 5 wt. % carbon dioxide, thereby converting at least a portion of the solid lithium precursor to lithium carbonate.

2. The method of claim 1, wherein the solid lithium precursor is milled in a jet mill with an atmosphere comprising the gas.

3. The method of claim 1, wherein the solid lithium precursor further comprises inorganic lithium salts, organic lithium salts, lithium metals, lithium alloys, lithium oxides, lithium hydroxides, or combinations thereof.

4. The method of claim 1, wherein the lithium hydroxide is lithium hydroxide monohydrate.

5. The method of claim 1, wherein the gas comprises at least 25 wt. % carbon dioxide.

6. The method of claim 5, wherein the gas comprises at least 50 wt. % carbon dioxide.

7. The method of claim 1, wherein at least 75% of the solid lithium precursor is converted into lithium carbonate.

8. The method of claim 1, wherein the lithium carbonate comprises micron-sized lithium carbonate particles and nano-sized lithium carbonate particles coated on the micron-sized lithium carbonate particles.

9. The method of claim 8, wherein the micron-sized lithium carbonate particles have a particle size distribution with a D50 of 1-10 microns.

10. The method of claim 8, wherein at least a portion of the micron-sized lithium carbonate particles are hollow.

11. The method of claim 1, wherein the lithium carbonate has a Brunauer-Emmett-Teller (BET) specific surface area of about 2-12 $m^2/g$.

12. The method of claim 1, further comprising drying the lithium carbonate with or without presence of carbon dioxide gas in a fluidized bed.

13. A powder comprising:
micron-sized lithium carbonate particles; and
nano-sized lithium carbonate particles coated on a surface of the micron-sized lithium carbonate particles.

14. The powder of claim 13, wherein at least a portion of the micron-sized lithium carbonate particles are hollow.

15. The powder of claim 13, wherein the micron-sized lithium carbonate particles have a particle size distribution with a D50 of 1-10 microns.

16. The powder of claim 13, wherein the lithium carbonate has a Brunauer-Emmett-Teller (BET) specific surface area of about 2-12 $m^2/g$.

* * * * *

UNITED STATES PATENT AND TRADEMARK OFFICE
CERTIFICATE OF CORRECTION

| | | |
|---|---|---|
| PATENT NO. | : 12,325,641 B2 | Page 1 of 1 |
| APPLICATION NO. | : 18/816364 | |
| DATED | : June 10, 2025 | |
| INVENTOR(S) | : Zhang et al. | |

It is certified that error appears in the above-identified patent and that said Letters Patent is hereby corrected as shown below:

In the Claims

Column 24, Lines 12-13, Claim 3, delete "lithium hydroxides" after "lithium oxides"

Signed and Sealed this
Sixteenth Day of September, 2025

Coke Morgan Stewart
*Acting Director of the United States Patent and Trademark Office*